(12) United States Patent
Cai et al.

(10) Patent No.: US 8,458,115 B2
(45) Date of Patent: Jun. 4, 2013

(54) MINING TOPIC-RELATED ASPECTS FROM USER GENERATED CONTENT

(75) Inventors: Rui Cai, Beijing (CN); Qiang Hao, Tianjin (CN); Changhu Wang, Beijing (CN); Rong Xiao, Beijing (CN); Lei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/796,303

(22) Filed: Jun. 8, 2010

(65) Prior Publication Data

US 2011/0302124 A1    Dec. 8, 2011

(51) Int. Cl.
*G06F 9/44*     (2006.01)
*G06N 7/02*     (2006.01)
*G06N 7/06*     (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS

| | | | | |
|---|---|---|---|---|
| 5,721,827 | A * | 2/1998 | Logan et al. ................ | 709/217 |
| 5,732,216 | A * | 3/1998 | Logan et al. ................ | 709/203 |
| 5,732,260 | A | 3/1998 | Nomiyama | |
| 5,832,100 | A | 11/1998 | Lawton et al. | |
| 5,924,108 | A | 7/1999 | Fein et al. | |
| 6,112,203 | A | 8/2000 | Bharat et al. | |
| 6,199,076 | B1 * | 3/2001 | Logan et al. ................ | 715/203 |
| 6,292,830 | B1 | 9/2001 | Taylor et al. | |
| 6,374,241 | B1 | 4/2002 | Lamburt et al. | |
| 6,393,415 | B1 | 5/2002 | Getchius et al. | |
| 6,397,228 | B1 | 5/2002 | Lamburt et al. | |
| 6,408,294 | B1 | 6/2002 | Getchius et al. | |
| 6,421,683 | B1 | 7/2002 | Lamburt | |
| 6,484,161 | B1 | 11/2002 | Chipalkatti et al. | |
| 7,281,005 | B2 | 10/2007 | Canright et al. | |
| 7,509,178 | B2 * | 3/2009 | Logan et al. ................ | 700/94 |
| 7,580,931 | B2 | 8/2009 | Liu et al. | |
| 7,617,176 | B2 | 11/2009 | Zeng et al. | |
| 7,890,502 | B2 | 2/2011 | Liu et al. | |
| 8,112,504 | B2 * | 2/2012 | Logan et al. ................ | 709/219 |
| 2005/0086260 | A1 | 4/2005 | Canright et al. | |
| 2006/0026152 | A1 | 2/2006 | Zeng et al. | |
| 2006/0085741 | A1 | 4/2006 | Weiner et al. | |
| 2007/0112815 | A1 | 5/2007 | Liu et al. | |
| 2007/0198506 | A1 | 8/2007 | Attaran Rezaei et al. | |
| 2007/0214116 | A1 | 9/2007 | Liu et al. | |
| 2008/0319974 | A1 | 12/2008 | Ma et al. | |

(Continued)

OTHER PUBLICATIONS

Asadi, Zhou, Jamali, Mofrad, "Location-Based Search Engines Tasks and Capabilities: A Comparative Study", retrieved on Apr. 15, 2010 at <<http://www.webology.ir/2007/v4n4/a48.html>>, Webology, vol. 4, No. 4, Article 48, 2007, pp. 1-15.

(Continued)

*Primary Examiner* — Michael B Holmes
(74) *Attorney, Agent, or Firm* — Lee & Hayes, PLLC

(57) ABSTRACT

Described herein is a technology that facilitates efficient automated mining of topic-related aspects of user generated content based on automated analysis of the user generated content. Locations are automatically learned based on dividing documents into document segments, and decomposing the segments into local topics and global topics. Techniques described herein include, for example, computer annotating travelogues with learned tags, performing topic learning to obtain an interest model, and performing location matching based on the interest model.

20 Claims, 14 Drawing Sheets

U.S. PATENT DOCUMENTS

| | | |
|---|---|---|
| 2009/0049038 A1 | 2/2009 | Gross |
| 2009/0119261 A1 | 5/2009 | Ismalon |
| 2009/0282032 A1 | 11/2009 | Liu et al. |
| 2009/0292685 A1 | 11/2009 | Liu et al. |
| 2009/0319342 A1 | 12/2009 | Shilman et al. |
| 2009/0327286 A1 | 12/2009 | Ge et al. |
| 2010/0153318 A1 | 6/2010 | Branavan et al. |
| 2011/0035403 A1 | 2/2011 | Ismalon |
| 2011/0137906 A1 | 6/2011 | Cai et al. |
| 2011/0252030 A1 | 10/2011 | Spangler |
| 2011/0302162 A1 | 12/2011 | Xiao et al. |

OTHER PUBLICATIONS

Blei, Ng, Jordan, "Latent Dirichlet Allocation", retrieved on Apr. 15, 2010 at <<http://www.cs.cmu.edu/~jch1/research/presentation/LDAUnrolled.ppt>>, Huang Presentation of Journal of Machine Learning Research, vol. 3, Jan. 2003, pp. 993-1022.

Gale, Kirillov, Mangold, "The Yahoo! Geo Technologies Blog", retrieved on Apr. 16, 2010 at <<http://www.ygeoblog.com/2009/02/location-aware-voice-enabled-search-on-the-hoof/>>, Yahoo! Inc., 2009, pp. 1.

Griffiths, Steyvers, "Finding Scientific Topics", retrievd on Apr. 15, 2010 at <<http://faculty.cs.byu.edu/~ringger/CS601R/papers/GriffithsSteyvers-PNAS-0307752101v1.pdf>>, Proceedings of Colquium of National Academy of Sciences (PNAS), Mapping Knowledge Domains at Arnold and Mabel Beckman Center of the National Academies of Sciences and Engineering, May 9, 2003, pp. 1-8.

Martins, Silva, Andrade, "Indexing and Ranking in Geo-IR Systems", retrieved on Apr. 15, 2010 at<<http://citeseerx.ist.psu.edu/viewdoc/download?doi=10.1.1.96.1329&rep=rep1&type=pdf>>, ACM, Proceedings of Workshop on Geographic Information Retrieval (GIR), 2005, pp. 31-34.

MetaCarta GSRP Core Function—GeoTag, retrievd on Apr. 15, 2010 at <<MetaCarta GSRP Core Function—GeoTag>>, MetaCarta, Inc., 2010, pp. 1.

C. Chemudugunta, P. Smyth, and M. Steyvers. Modeling general and specific aspects of documents with a probabilistic topic model. NIPS, 2006. http://books.nips.cc/papers/files/nips19/NIPS2006_0305.pdf and http://www.datalab.uci.edu/papers/special_words_NIPS06.pdf.

C. Wang, J. Wang, X. Xie, W.Y. Ma. Mining geographic knowledge using location aware topic model. GIR, 2007. http://delivery.acm.org/10.1145/1320000/1316967/p65-xie.pdf?key1=1316967&key2=2384041721&coll=GUIDE&dl=GUIDE&CFID=86382884&CFTOKEN=75030121.

D. Crandall, L. Backstrom, D. Huttenlocher, and J. Kleinberg. Mapping the Worlds Photos. WWW, 2009. http://www.www2009.org/proceedings/pdf/p761.pdf and http://www.cs.cornell.edu/~dph/papers/photomap-www09.pdf.

D. M. Blei, A. Y. Ng, and M. I. Jordan. Latent dirichlet allocation. JMLR, 3:993-1022, 2003. http://www.cs.utah.edu/~hal/courses/2008S_ML/BleiNgJordan2003.pdf and http://www.cs.princeton.edu/~blei/papers/BleiNgJordan2003.pdf.

D. Newman, C. Chemudugunta, P. Smyth, and M. Steyvers. Statistical entity-topic models. KDD, 2006. http://psiexp.ss.uci.edu/research/papers/Newman_SIGKDD06.pdf and http://citeseerx.ist.psu.edu/viewdoc/download?doi=10.1.1.79.4014&rep=rep1&type=pdf.

E. Moxley, J. Kleban, and B. S. Manjunath. SpiritTagger: a geo-aware tag suggestion tool mined from Flickr. MIR 2008. http://vision.ece.ucsb.edu/publications/moxley_MIR_2008.pdf.

F. Jing, L. Zhang, and W.Y. Ma. VirtualTour: an online travel assistant based on high quality images. MM, 2006. http://research.microsoft.com/users/leizhang/Paper/ACMMM06-VT.pdf and http://citeseerx.ist.psu.edu/viewdoc/download?doi=10.1.1.68.921&rep=rep1&type=pdf.

Flickr. http://www.flickr.com/.

Hao, et al., Equip Tourists with Knowledge Mined from Travelogues, WWW2010, Apr. 24-30, 2010, Raleigh, North Carolina, 10 pages. http://research.microsoft.com/apps/pubs/default.aspx?id=121309.

Hao, Cai, Yang, Xiao, Liu, Wang, Zhang, "TravelScope: Standing on the Shoulders of Dedicated Travelers", retrieved on Apr. 15, 2010 at <<http://research.microsoft.com/en-us/people/jmyang/mm_2009_travelscope.pdf>>, ACM, Conference on Multimedia (MM), Oct. 19, 2009, pp. 1021-1022.

I. Simon, N. Snavely, and S. M. Seitz. Scene summarization for online image collections. ICCV, 2007. http://www.cs.washington.edu/homes/iansimon/papers/canonview.pdf and http://citeseerx.istpsu.edu/viewdoc/download?doi=10.1.1.79.4888&rep=rep1&type=pdf.

I. Titov and R. McDonald. Modeling online reviews with multi-grain topic models. WWW, 2008. http://www2008.org/papers/pdf/p111-titov.pdf and http://citeseerx.ist.psu.edu/viewdoc/download?doi=10.1.1.134.4753&rep=rep1&type=pdf.

J. Chang, J. Boyd-Graber, and D. M. Blei. Connections between the lines: augmenting social networks with text. KDD, 2009. http://www.cs.princeton.edu/~jbg/documents/kdd2009.pdf and http://www.umiacs.umd.edu/~jbg/docs/kdd2009.pdf.

J. Kim, H. Kim, and J. Ryu. TripTip: a trip planning service with tag-based recommendation, retrieved at <<http://delivery.acm.org/10.1145/1530000/1520504/p3467-kim.pdf?key1=1520504&key2=7074041721&coll=GUIDE&dl=GUIDE&CFID=84495268&CFTOKEN=22059900>>, CHI, 2009.

K. Jarvelin and J. Kekalainen. IR evaluation methods for retrieving highly relevant documents. SIGIR, 2000. http://www.info.uta.fi/tutkimus/fire/archive/KJJKSIGIR00.pdf and http://citeseerx.istpsu.edu/viewdoc/download?doi=10.1.1.20.2887&rep=rep1&type=pdf.

Kennedy, Naaman, Ahern, Nair, Rattenbury, "How Flickr Helps us Make Sense of the World: Context and Content in Community-Contributed Media Collections", retrieved on Apr. 15, 2010 at <<http://infolab.stanford.edu/~mor/research/kennedyMM07.pdf>>, ACM, Conference on Multimedia (MM), Sep. 23, 2007, pp. 631-640.

L. Kennedy and M. Naaman. Generating diverse and representative image search results for landmarks. WWW, 2008. http://infolab.stanford.edu/~mor/research/kennedy-www08.pdf.

M. Bressan, G. Csurka, Y. Hoppenot, and J. M. Renders. Travel Blog Assistant System (TBAS)-an example scenario of how to enrich text with images and images with text using online multimedia repositories. Metadata Mining for Image Understanding Workshop, 2008. http://eprints.pascal-network.org/archive/00003535/01/Visapp_MMIU_TBAS.pdf and http://eprints.pascal-network.org/archive/00003535/01/Visapp_MMIU_TBAS.pdf.

M. Rosen-Zvi, T. Griffiths, M. Steyvers, and P. Smyth. The author-topic model for authors and documents. UAI, 2004. http://psiexp.ss.uci.edu/research/papers/uai04_v8.pdf and http://citeseerx.ist.psu.edu/viewdoc/download?doi=10.1.1.133.5669&rep=rep1&type=pdf.

Nanba, Taguma, Ozaki, Kobayashi, Ishino, Takezawa, "Automatic Compilation of Travel Information from Automatically Identified Travel Blogs", retrieved on Apr. 15, 2010 at <<http://nlp.csie.ncnu.edu.tw/~shin/acl-ijcnlp2009/proceedings/CDROM/Short/pdf/Short052.pdf>>, Association for Computational Linguistics, Proceedings of ACL-IJCNLP Conference Short Papers, Aug. 2009, pp. 205-208.

Popescu, Grefenstette, Moellic, "Mining Tourist Information from User-Supplied Collections", retrieved on Apr. 15, 2010 at <<http://comupedia.org/adrian/articles/sp0668-popescu.pdf>>, ACM, Proceeding of Conference on Information and Knowledge Management (CIKM), Nov. 2, 2009, pp. 1713-1716.

Q. Hao, R. Cai, X.J. Wang, J.M. Yang, Y. Pang, and L. Zhang. Generating location overviews with images and tags by mining user-generated travelogues, retrieved at <<http://portal.acm.org/ft_gateway.cfm?id=1631418&type=pdf&coll=GUIDE&dl=GUIDE&CFID=84477644&CFTOKEN=48379563>>, MM, 2009.

Q. Mei, C. Liu, H. Su, and C. Zhai. A probabilistic approach to spatiotemporal theme pattern mining on weblogs. WWW, 2006. http://www2006.org/programme/files/pdf/544.pdf and http://citeseerx.ist.psu.edu/viewdoc/download?doi=10.1.1.81.4041&rep=rep1&type=pdf.

Q. Mei, C. Zhai. A mixture model for contextual text mining. KDD, 2006. http://net.pku.edu.cn/~course/cs410/reading/kdd06-mix.pdf and http://net.pku.edu.cn/~course/cs410/reading/kdd06-mix.pdf.

Q. Mei, D. Cai, D. Zhang, and C. Zhai. Topic modeling with network regularization. WWW, 2008. http://wwwconference.org/www2008/papers/pdf/p101-meiA.pdf and http://citeseerx.ist.psu.edu/viewdoc/download?doi=10.1.1.114.3088&rep=rep1&type=pdf.

S. Ahern, M. Naaman, R. Nair, and J. Yang. World Explorer: visualizing aggregate data from unstructured text in geo-referenced collections, retrieved at <<http://citeseerx.ist.psu.edu/viewdoc/download-?doi=10.1.1.91.5289&rep=rep1&type=pdf>>, JCDL, 2007. http://infolab.stanford.edu/~mor/research/JCDL07-ahern-WorldExplorer.pdf.

T. Griffiths and M. Steyvers. Finding scientific topics. PNAS,101 5228-5235, 2004. http://www.pnas.org/cgi/content/full/101/suppl_1/5228 http://faculty.cs.byu.edu/~ringger/CS601R/papers/GriffithsSteyvers-PNAS-0307752101v1.pdf.

Titov, McDonald, "A Joint Model of Text and Aspect Ratings for Sentiment Summarization", retrieved on Apr. 15, 2010 at <<http://www.aclweb.org/anthology/P/P08/P08-1036.pdf>>, Proceedings of Meeting by Association for Computational Linguistics (ACL), Jun. 2008, pp. 308-316.

X. Wu, J. Li, Y. Zhang, S. Tang, and S.-Y. Neo. Personalized multimedia web summarizer for tourist. WWW, 2008. http://www2008.org/papers/pdf/p1025-wu.pdf and http://www2008.org/papers/pdf/p1025-wu.pdf.

Y.T. Zheng, M. Zhao, Y. Song, H. Adam, U. Buddemeier, A. Bissacco, F. Brucher, T.S. Chua, and H. Neven. Tour the world: building a web-scale landmark recognition engine, retrieved at <<http://www.google.com/googleblogs/pdfs/google_landmark_recognition.pdf>>, CVPR, 2009. http://www.google.com/googleblogs/pdfs/google_landmark_recognition.pdf.

Zhuang, Jing, Zhu, "Movie Review Mining and Summarization", retrieved on Apr. 15, 2010 at <<http://research.microsoft.com/en-us/um/people/leizhang/Paper/cikm06_movie.pdf>>, ACM, Proceedings of Conference on Information and Knowledge Management, 2006, pp. 43-50.

Office Action for U.S. Appl. No. 12/796,345, mailed on Jan. 26, 2012, Rong Xiao, "Snippet Extraction and Ranking," 20 pages.

Final Office Action for U.S. Appl. No. 12/796,345, mailed on May 4, 2012, Rong Xiao et al., "Snippet Extraction and Ranking," 18 pages.

Tsai, "GeoSearch: Enabling Location-Aware Search on the Geographic Web," retrieved on Apr. 16, 2010 at <<http://www3.ntu.edu.sg/home/efstsai/GeoSearch/>>, Nanyang Technological University School of EEE, Singapore, 2010, pp. 1-5.

* cited by examiner

MINING TOPIC-RELATED ASPECTS FROM USER GENERATED CONTENT

BACKGROUND

As various Web 2.0 technologies have prospered, blogging has become increasingly popular with consumers who increasingly share information about their experiences, frequently including information about travel experiences. While consumers increasingly may read such information on the Web, they are not always able to make use of it for their own travel planning because user blog entries are prolific and the information is unstructured, inconsistent, and influenced by the authors' personal biases, which are not always apparent to a reader. Thus, when looking for travel information, consumers often turn to travel planning sites, rather than user blogs. However many travel planning sites rely on editorial content, which may reflect the editors' biases and may be influenced by advertisers and partnerships, which may not be readily apparent to the consumer.

SUMMARY

A technology that facilitates automated mining of topic-related aspects from user-generated content based on automated analysis using a particular probabilistic topic model is described herein. An example described is mining location-related aspects based on automated analysis of travelogues using a Location-Topic (LT) model. By mining location-related aspects from travelogues via the LT model, useful information is synthesized to provide rich information for travel planning. As described herein, these techniques include performing decomposition of travelogues using dimension reduction to obtain locations (e.g. geographical locations such as cities, countries, regions, etc.). A travelogue is decomposed into two topics, local topics (e.g. characteristics of a location such as tropical, beach, ocean, etc.), and global topics (e.g. amenities shared by various geographical locations without regard to the characteristics of the particular location such as hotel, airport, taxi, pictures, etc.).

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit of a reference number identifies the figure in which the reference number first appears. The use of the same reference numbers in different figures indicates similar or identical items. A reference number with a parenthetical suffix (e.g., "104(1)" or "112(a)") identifies a species of the feature represented by the general reference number (e.g., "104" or "112"). Use of the general reference number without a parenthetical suffix (e.g., "104" or "112") identifies the genus or any one or more of the species.

DETAILED DESCRIPTION

Overview

Figure 1:
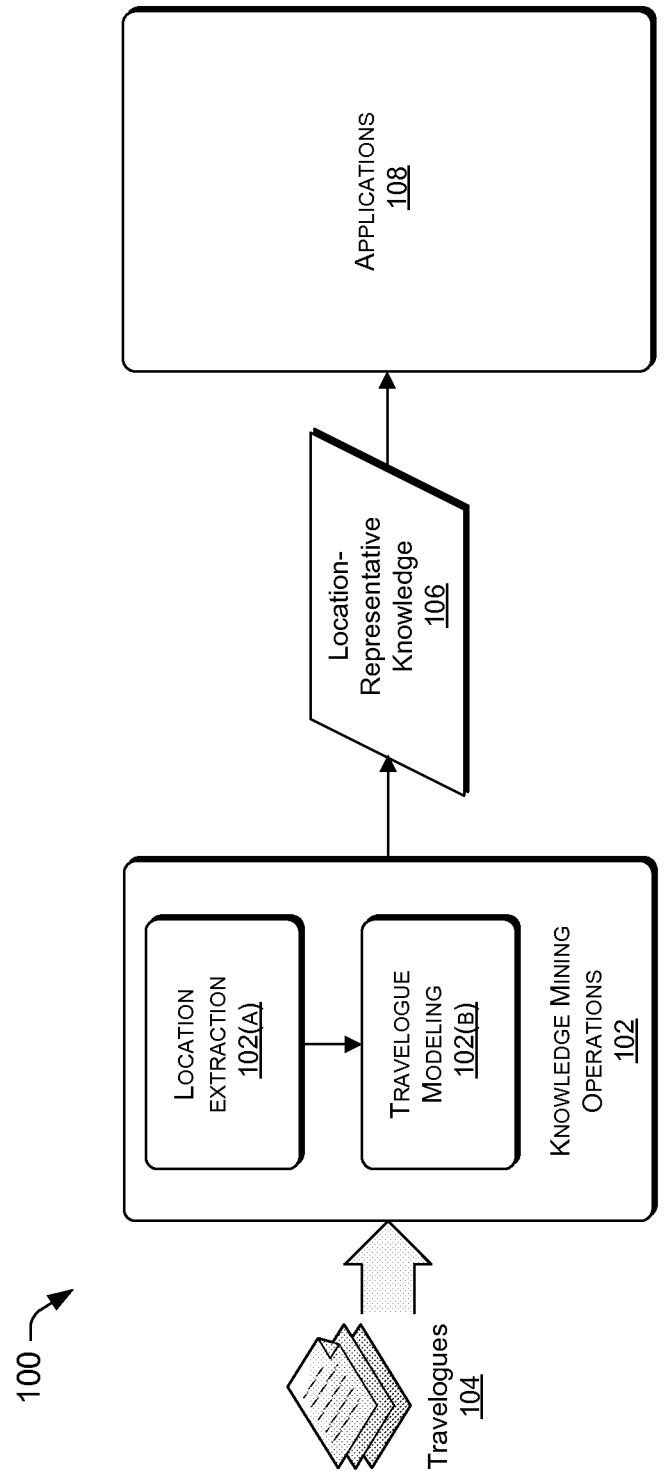
FIG. 1 is a block diagram of an example of a framework for mining and using topic-related aspects from user-generated content comprising travelogues.

This disclosure is directed to a framework and techniques for automated mining of topic-related aspects from user generated content, e.g., automated mining of location-related aspects from travelogues. The described operations facilitate automatic synthesizing of recommendations from the user-generated content, summarizing user-generated content, and enriching of user-generated content with images based on automated analysis of user-generated content using a particular probabilistic topic model. For example, the described operations facilitate automatic synthesizing of destination recommendations, summarizing of destinations, and enriching of travelogues with images based on automated analysis of travelogues using a Location-Topic (LT) model. By mining location-related aspects from travelogues via the LT model, useful information is synthesized to provide rich information for travel planning.

The described LT model facilitates automatically mining location-related aspects from user-generated content, such as travelogues, by decomposing the user-generated content to discover two parts, local topics and global topics, and extracting locations based on the local topics. In the context of automatically mining location-related knowledge from travelogues, local topics characterize locations from the perspective of travel (e.g., sunset, cruise, coastline, etc.). In the context of automatically mining location-related knowledge from travelogues, global topics do not particularly characterize locations but instead extensively co-occur with various locations in travelogues, (e.g., hotel, airport, photo, etc.).

Acquiring knowledge from travelogues to meet the information needs of tourists planning travel is challenging, due in part to intrinsic limitations of the raw travelogue data, including noisy topics, multiple viewpoints, lack of destination recommendations, and lack of destination comparisons.

Noisy topics arise from the unstructured style of user generated content. Travelogues, and other such user generated content typically contain a lot of noise. For example, the depictions of destinations and attractions, in which tourists planning travel are most interested, are usually intertwined with topics, such as lodging and transportation, common in various travelogues for different locations.

Multiple viewpoints come from many previous travelers' excursions to various destinations. When planning travel to a destination, one is faced with a dilemma because the viewpoint of a single travelogue may be biased, while reading a large number of travelogues about the same or similar destinations may be too time consuming. Additionally, few tourists want to spend the time to create an overview summarizing travelogues related to the same or similar destinations. While some overviews may be found on the Internet, their content is typically editorial. In other words, the content is controlled by an editor, such as a paid travel planner, travel agent, or marketer, and may not be unbiased or accurately reflect the opinions of many previous travelers about a destination.

User-created travelogues do not typically provide destination recommendations based on local characteristics. A collection of travelogues may cover many popular travel destinations, but the depictions in a single travelogue usually only include, at most, a few destinations. Hence, for tourists who are seeking travel with a particular characteristic, (e.g., going to a beach, going to the mountains, going hiking, etc.), there is not a straightforward and effective way to obtain unbiased recommendations from the traveler's point of view.

In user-created travelogues, besides occasional explicit comparisons made by authors, little information is typically provided about similarity between destinations. However, such comparison information is often helpful for those planning travel who may be seeking suggestions about destinations similar (or dissimilar) to particular destinations with which they are familiar.

In view of the above challenges, several kinds of information processing techniques are leveraged to mine location-related aspects from travelogues to bridge the gap between raw travelogue data and the information needs of tourists planning travel. Regarding the issue of noisy topics, techniques for mining location-related aspects from travelogues discover topics in travelogues and further distinguish location-related topics from other noisy topics.

Regarding the issue of multiple viewpoints, techniques for mining location-related aspects from travelogues generate a representation of locations that summarizes useful descriptions of a particular location to capture representative knowledge of the location. Such representative knowledge of the location includes, for example, characteristics from the perspective of tourism, (e.g., attractions, activities, styles).

Regarding destination recommendations, techniques for mining location-related aspects from travelogues apply a relevance metric to suggest locations most relevant to tourists' travel intentions.

Regarding destination comparisons, techniques for mining location-related aspects from travelogues employ a location similarity metric to compare locations from the perspective of travel. Tools for mining location-related aspects from travelogues address noisy topics and multiple viewpoints because the location-representative knowledge mined from many location-related topics provide the input for the ranking and similarity metrics for locations.

In some situations, travelogues have associated tags. Such tags are entered by users and can help identify the subject matter of travelogues. However, travelogue entries may reference multiple locations that may not be captured in the tags. For example, an entry describing a road trip along the California coast between Los Angeles and San Francisco may contain information of interest for those planning travel to California generally, as well as travel to Los Angeles and/or San Francisco. However, the author may simply tag the entry "road trip." Additionally, users sometimes tag travelogue entries with names or captions, like "Travis," "honeymoon," or "spring break." Thus, even when users save or submit tags with their travelogues, the user-submitted tags may not be particularly relevant to understanding locations associated with the travelogue. Nor will the user-submitted tags necessarily be helpful for travel planning because, for example, a companion's name is personal and not likely to be associated with a location.

Reliance on user-submitted tags can be problematic for several reasons. For example, user-submitted tags may cause a lexical gap or a semantic gap, and many travelogues do not have user-submitted tags.

A lexical gap caused by user-submitted tags may be understood from the following example. When users tag travelogue entries, they often tag travelogue entries with names. For example, a travelogue about a family reunion may be tagged with the names of the family members who attended. However, the names of the attendees are not likely to be in text associated with other travelogue entries, for example, written by other users, associated with the same location or characteristics of that location. Thus a lexical, or word gap would exist for results based on the user-submitted tags.

Similarly, a semantic gap caused by user-submitted tags, although more complex, may be understood from the following example. The term "beach" may appear in user-submitted tags, but semantically "beach" is not specific enough to indicate whether the travelogue entry discusses a tropical beach, a stormy beach, a secluded beach, etc. Some user-submitted tags will include a descriptor such as "tropical," "stormy," "secluded," etc. When such descriptors are included in user-submitted tags, they may be helpful to show relevant entries. However, because user-submitted tags are inconsistent, an entry discussing a beach without such a descriptor may be at least as relevant for travel planning as an entry discussing a beach with a descriptor. Thus a semantic or meaning gap would exist for results based on the user-submitted tags. Furthermore, as mentioned above, many travelogues do not have user-submitted tags. Thus, tag-based analysis of travelogues from user-submitted tags is not possible for those untagged travelogues. In various implementations, mining location-related knowledge from travelogues employs an automatic tagging application to overcome the lexical and semantic gaps or dearth of user-submitted tags. In at least one embodiment, even when user-submitted tags are available, such tags are disregarded during mining of location-related knowledge from travelogues to obviate the lexical and semantic gaps that user-submitted tags introduce.

A system for mining topic-related aspects from user-generated content is set forth first below. The system described below constitutes but one example and is not intended to limit application of the techniques to any one particular architecture. Other systems may be used without departing from the spirit and scope of the claimed subject matter. Additional sections describe instances of various techniques, examples of implementations, and illustrative embodiments. These sections describe ways in which travel planning may be enhanced. For example, destinations may be mined from user generated travelogues for travel planning enrichment via enhanced results. In various implementations parts of the knowledge mining operations presented may occur offline, online, before activation of applications that use the mined knowledge, or in real time. An example of an environment in which these and other techniques may be enabled is also set forth.

Although the described embodiments discuss travel planning, the techniques described herein are also useful to determine user generated content of interest for aggregation on a variety of topics such as housing, higher education, entertainment, etc.

Example Framework

FIG. 1, illustrates an example of a framework 100 for mining topic-related aspects from user-generated content, e.g., mining location-related aspects from user-generated travelogues. FIG. 1 also illustrates that knowledge learned from the location-related aspects may be used in any of multiple applications. According to framework 100, knowledge mining operations 102 are performed to extract location-related aspects from travelogues 104.

In the example illustrated, knowledge mining operations 102 include location extraction 102(A) and travelogue modeling 102(B). The knowledge mining operations 102 result in location-representative knowledge 106 that supports applications 108.

Location extraction 102(A) is performed to extract locations mentioned in the text of a travelogue 104. Travelogue modeling 102(B) trains a Location-Topic (LT) model on locations extracted from travelogues 104 to learn local and global topics, as well as to obtain representations of locations in the local topic space. A topic space is a multi-dimensional geometric space, in which each dimension represents a single semantic topic.

Location-representative knowledge 106 may include, for example, locations (e.g., Hawaii, Poipu Beach, San Francisco, etc.), local topics (e.g., sunset, beach, lava, bridge, etc.), and global topics (e.g., hotel, airport, photo, etc.).

Applications 108 may include, for example, applications providing destination recommendations, destination summaries, and/or for enriching travelogues with mined content. Several applications 108 are discussed in more detail regarding FIG. 3, below.

Figure 2:
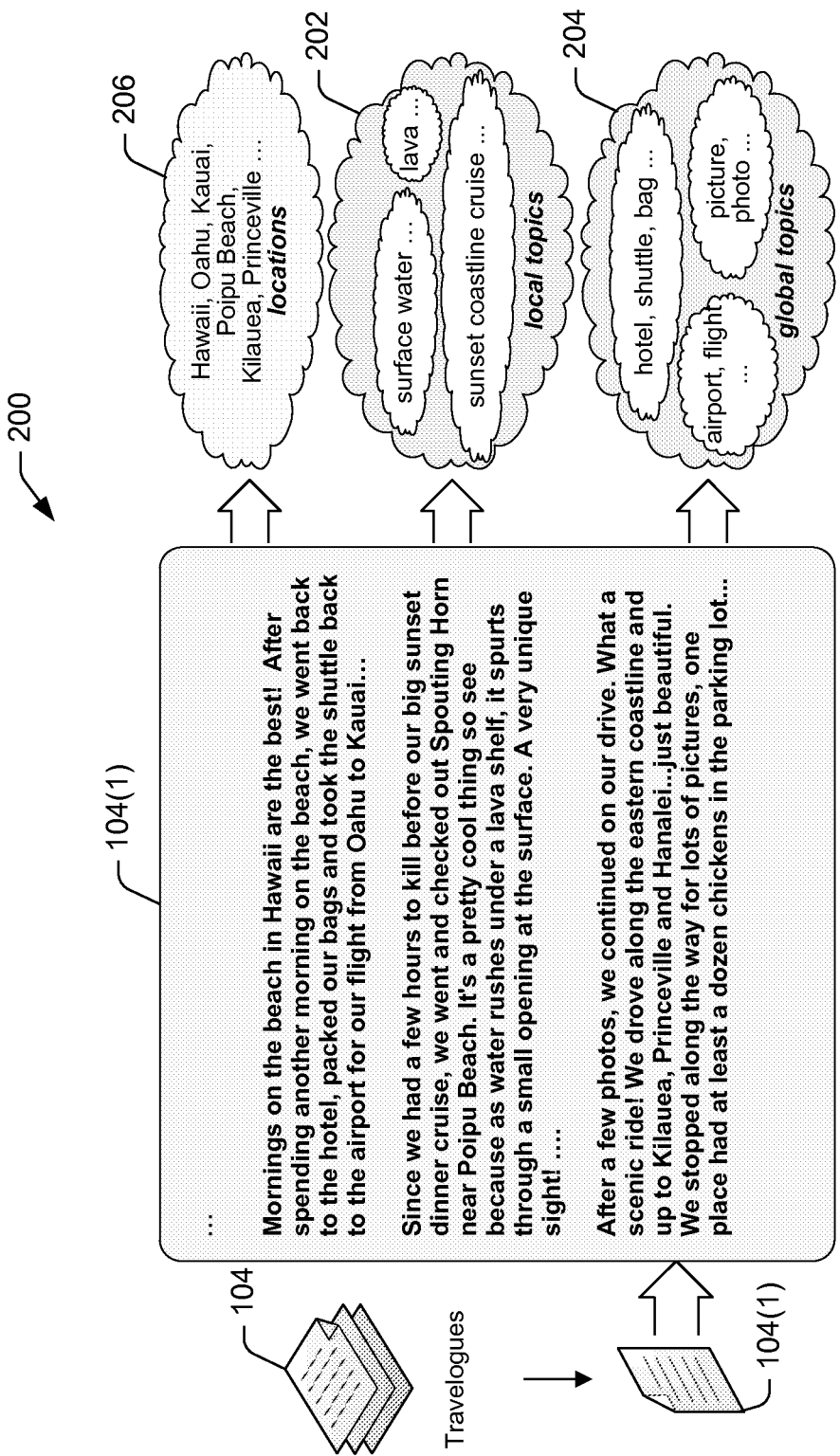
FIG. 2 is a pictorial representation of a decomposition model applied to a travelogue.

FIG. 2 illustrates decomposition 200 of three example snippets of content, e.g., content from a travelogue 104(1) from travelogues 104.

As shown in FIG. 2, a travelogue may contain a variety of topics. In the illustrated example, local topics extracted from travelogue 104(1) are shown at 202, global topics extracted from travelogue 104(1) are shown at 204, and locations from travelogue 104(1) are shown at 206. In the illustrated example, locations are extracted. In other examples, locations at 206 may be learned based on local topics 202.

As discussed above, discovered topics include two types of topics. Local topics 202 characterize locations from the perspective of travel (e.g., sunset, cruise, coastline, etc.). Global topics 204 do not particularly characterize locations but rather extensively co-occur with various locations in travelogues such as hotel, airport, photo, etc.

Implementations of the tools for mining location-related aspects from travelogues include a new probabilistic topic model, termed a Location-Topic (LT) model, to discover topics from travelogues and virtually simultaneously represent locations with corresponding appropriate topics. The LT model defines two different types of topics. One type of topic includes local topics, which characterize specific locations from the perspective of travel (e.g., sunset, cruise, coastline, etc.). Another type of topic includes global topics, which do not particularly characterize certain locations but rather extensively co-occur with reference to various locations in travelogues (e.g., hotel, airport, etc.).

Travelogues are decomposed into local and global topics based on the Location-Topic (LT) model that extracts location-representative knowledge from local topics, while filtering out other semantics captured by global topics. Based on the LT model a particular location may be represented as a mixture of local topics mined from a travelogue collection. This facilitates automatically summarizing multiple viewpoints of a location. Moreover, based on learned location representation in a local topic space of the LT model, quantitative measurement of both the relevance of a location to a given travel idea and similarity between locations is possible.

With requests for a location, relevant results to be mined may be determined based on an intersection of the location itself using the LT model. With requests for characteristics of locations, e.g., surf, tropical, ocean, etc. relevant results to be mined may be determined based on an intersection of the characteristics and associated locations using the LT model.

Figure 3:
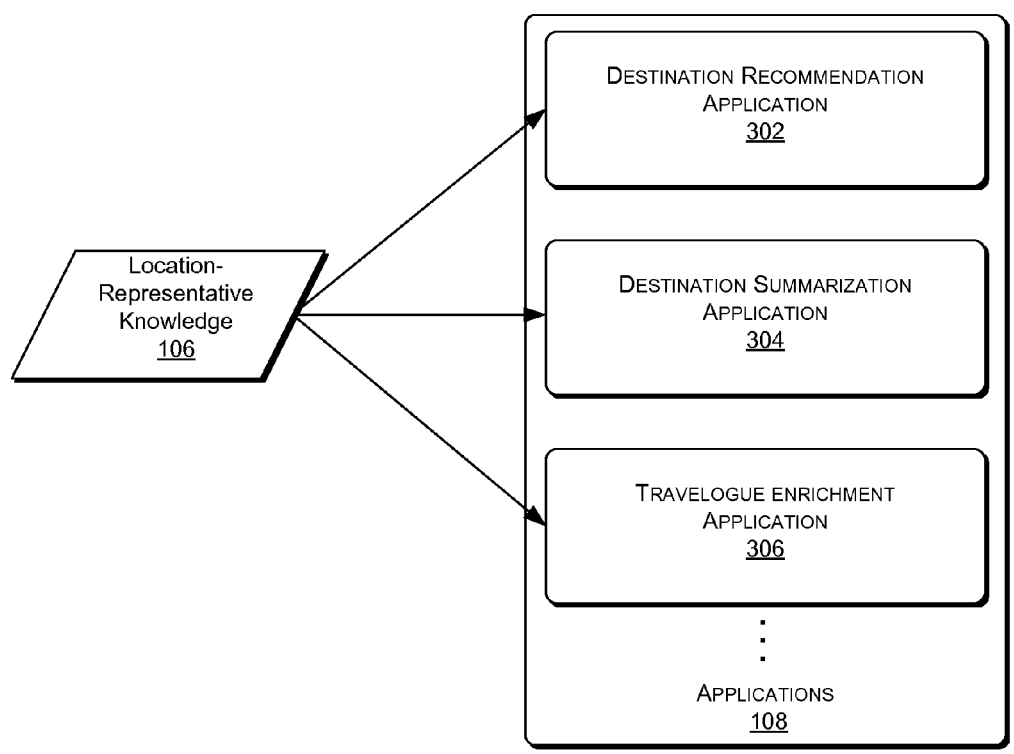
FIG. 3 is a block diagram of example travel planning applications that utilize location-related aspects mined from travelogues.

FIG. 3 illustrates three examples of applications that may utilize the knowledge learned by the LT model. In an example of one scenario, the LT model automatically provides support for a three step approach to travel planning: 1) selecting a destination from several recommended destinations, 2) browsing characteristics of the selected destination to get an overview of the destination, and 3) browsing image enhanced travelogues to learn details, for example, about travel routes and experiences. To facilitate these three steps, three applications 108 are implemented in the illustrated example. Applications 108 include destination recommendation application 302, destination summarization application 304, and travelogue enrichment application 306.

As shown in FIG. 3, the applications 108 utilize location-representative knowledge 106 resulting from knowledge mining operations 102. Although destination recommendation application 302, destination summarization application 304, and travelogue enrichment application 306 are illustrated as examples, other applications may well leverage knowledge mining operations 102.

Destination recommendation application 302 provides recommended destinations, in terms of either similarity to a particular destination such as Miami, Honolulu, Aspen, Whistler, etc. or relevance to a given travel subject such as beach, diving, mountains, skiing, hiking, etc.

Often the first question for a tourist seeking to plan travel is "where should I go?" Meanwhile, the tourist typically has some preferences regarding travel destinations, which are usually expressed in terms of two criteria, similarity and intention. The first criterion, similarity, represents a desire that the new travel destination be similar to a given location, e.g., "I enjoyed the trip to Honolulu last year. Is there another destination with similar style?" The second criterion, intention, represents a desire that the new travel destination be relevant to a given travel intention, e.g., "I plan to go hiking next month. Could you recommend some good hiking destinations?"

To obtain a similarity-oriented recommendation in accordance with the similarity criterion, given a set of candidate destinations and a query location (e.g., "Honolulu"), each destination is determined to have a similarity to the query location in the local topic space. Moreover, whatever the given query, every destination has an intrinsic popularity which is accounted for by the destination recommendation application represented by 302. The destination recommendation application, represented by 302, computes rank scores for recommendations in a way that controls the influence of the intrinsic popularity in ranking. The intrinsic popularity is approximated by how often a destination is described in travelogues. As new travelogue entries are collected from the Web, intrinsic popularity is updated to reflect trends in travel revealed in the travelogues.

To obtain a relevance-oriented recommendation in accordance with the intention criterion, given a travel intention described by a term (e.g., "hiking"), the destination recommendation application, represented by 302, ranks destinations in terms of relevance to the query. Travel intention contains more semantics than a single term. Thus, in various implementations, to provide a comprehensive representation to the travel ideal, the destination recommendation application, represented by 302, expands the single term in the local topic space as a distribution over the local topics. In this way, the relevance of each location to the query is automatically measured, for example, using Kullback-Leibler (KL)-divergence. This query expansion strategy supports more complex travel intentions, and enables operation on multiword or natural language queries in several implementations.

Destination summarization application 304 provides an overview of a destination by automatically summarizing its representative aspects. In at least one implementation, textual tags are automatically generated to summarize a destination's representative aspects. Alternately, or in addition to automatically generated tags, representative snippets from travelogues may also be offered as further descriptions to verify and interpret the relationship between a generated tag and the destination.

Once a potential destination has been determined, a travel planner may desire more details about the destination. For example, "What are the most representative things about San Francisco?" The request may include "Can you tell me in a few words or sentences?" In some implementations, such requests may represent additional criteria to the similarity and intention criteria discussed above. In one implementation, to summarize representative aspects of a destination, the LT model generates representative tags and identifies related snippets for each tag to describe and interpret relationships between a tag and the corresponding destination.

For a given location in knowledge mining operations 102, the LT model ranks the terms according to probability. Those terms with higher probabilities to serve as representative tags are selected for the location. In at least one implementation, given a selected tag, the LT model generates corresponding snippets via ranking all of the sentences in the travelogues 104 according to the query. From the set of candidate locations, the sentences in the travelogues 104, and the ranked terms, the sentence is ranked in terms of geographic relevance to a location. Correspondingly, the sentence is ranked in terms of semantic relevance to a tag. Using the above techniques each term in a sentence contributes to semantic relevance according to similarity.

Travelogue enrichment application 306 automatically identifies informative parts of a travelogue and automatically enhances them with related images. Such enhancement improves browsing and understanding of travelogues and enriches the consumption experience associated with travel planning.

In addition to a recommendation provided by destination recommendation application 302 or a brief summarization provided by destination summarization application 304, travelogues written by other tourists may be of interest to a travel planner.

Given a travelogue, a reader is usually interested in which places the author visited and in seeing pictures of the places visited. For example, "Where did Jack visit while he was in New York?" The request may include, "What does the Museum of Modern Art in New York look like?" In some implementations, such requests may represent additional criteria to those discussed above. To facilitate enriched travelogue browsing, the LT model detects a highlight of a travelogue and enriches the highlight with images from other sources to provide more visual descriptions.

For example, when a travelogue refers to a set of locations, the LT model treats informative depictions of locations in the set as highlights. Each term in a document has a possibility to be assigned to a location. In this way, a generated highlight of the location may be represented with a multidimensional term-vector and enriched with related images.

Figure 4A:
FIGS. 4A and 4B illustrate travelogue snippets enhanced with images.
Figure 4A:
Figure 4B:
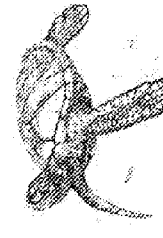
Figure 4B:
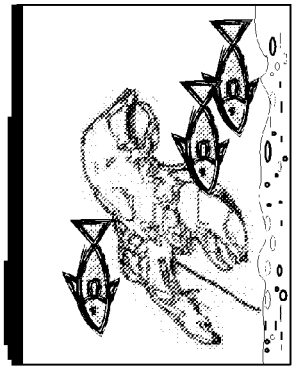
Figure 4B:
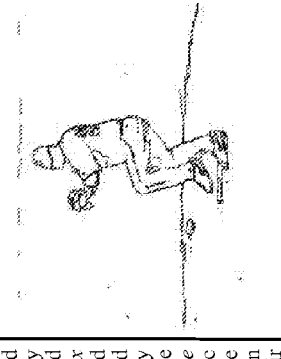

FIGS. 4A and 4B illustrate two travelogue snippets selected using the LT model. The snippets are each highlighted with images according to corresponding tags as discussed above regarding destination summarization application 304 and travelogue enrichment application 306. Thus, FIGS. 4A and 4B represent examples of results obtained by an implementation of travelogue enrichment application 306. In the illustrated examples, three images highlight informative parts of the respective travelogue segments. The terms under each image are the raw tags for that image and the words in the travelogue text to which the image corresponds. For instance, in FIG. 4A, the presented images depict representative and diverse semantics from the travelogue text including semantics related to diving, a volcano, and a beach. In FIG. 4B, the presented images depict representative and diverse semantics from the travelogue text including semantics related to baseball, an aquarium, and a harbor.

Figure 5A:
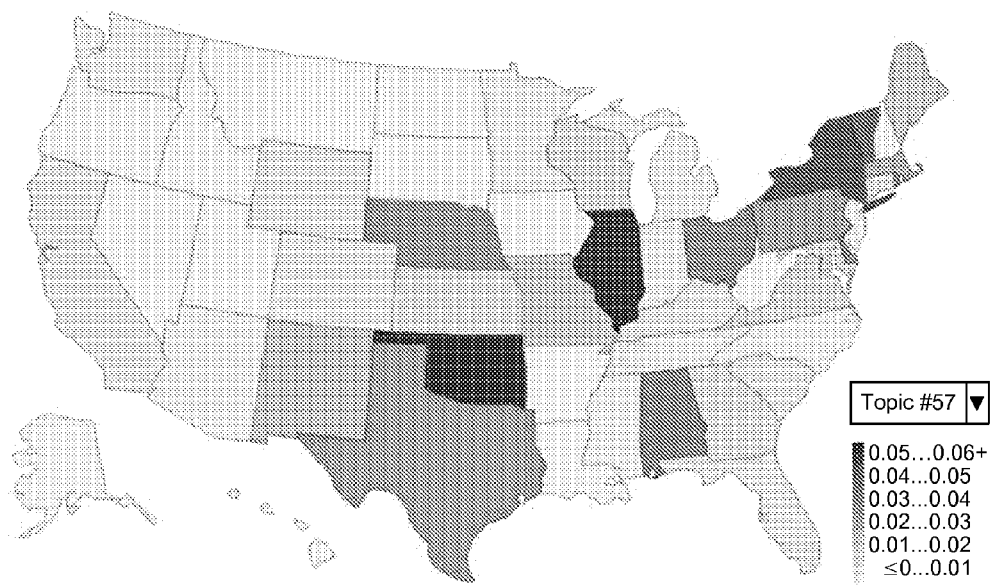
FIGS. 5A and 5B are pictorial representations of geographic distributions of two local topics mined from multiple travelogues.
Figure 5B:
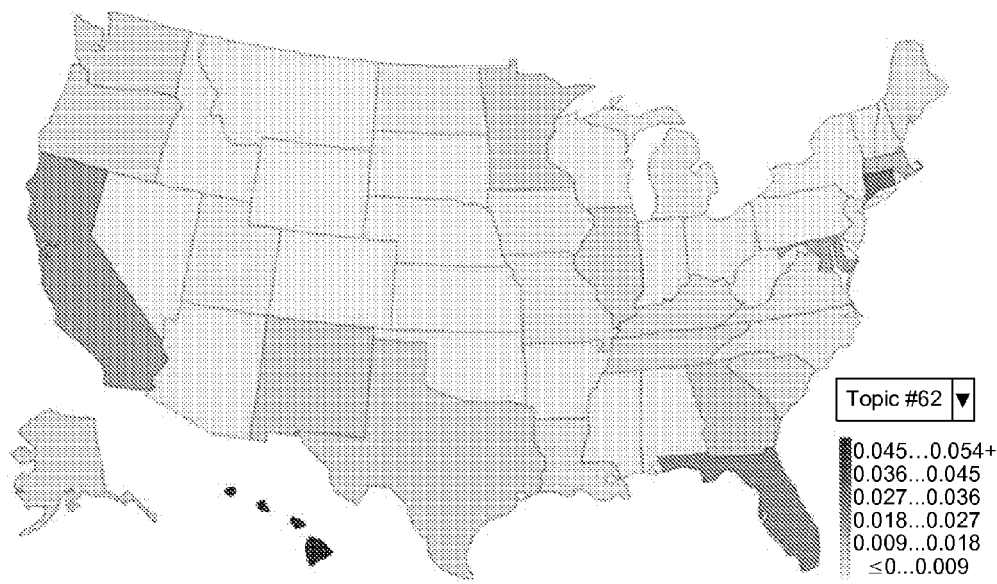

FIGS. 5A and 5B illustrate examples of geographic distributions of two local topics within the United States of America.

To illustrate topics learned by the LT model, the top 10 words (i.e., the 10 words with the highest probabilities in a topic) for several example topics, including those presented in FIG. 5A and FIG. 5B, are shown in Table 1.

For example, in Table 1, local topic #23 may be understood to represent a hiking trip to Arizona. Global topic #8, placed directly below local topic #23 could correspond to the same hiking trip. However, global topic #8, as well as the other global topics represented could correspond to any of the local topics. Similarly, local topic #62 may represent a vacation in San Diego. Global topic #22, directly below local topic #62 in Table 1, could also correspond to a vacation in San Diego. However, global topic #22 may be just as applicable to the other examples of local topics presented in Table 1, including local topic #23. However, local topics #23 and #62 do not share any characteristics as the desert and seaside locations they represent are vastly different.

TABLE 1

| Local #23 | Local #57 | Local #62 | Local #66 | Local #69 |
|---|---|---|---|---|
| desert | museum | dive | casino | mountain |
| cactus | art | snorkel | gamble | peak |
| canyon | collect | fish | play | rocky |
| valley | gallery | aquarium | slot | snow |

TABLE 1-continued

| | | | | |
|---|---|---|---|---|
| hot | exhibit | sea | table | high |
| west | paint | boat | machine | feet |
| heat | work | whale | game | lake |
| spring | sculpture | reef | card | summit |
| plant | america | swim | money | climb |
| dry | artist | shark | buffet | elevate |
| Global #8 | Global #19 | Global #22 | Global #26 | Global #37 |
| flight | great | kid | room | rain |
| airport | best | family | hotel | weather |
| fly | fun | old | bed | wind |
| plane | beautiful | children | inn | cold |
| check | enjoy | fun | breakfast | temperature |
| bag | wonderful | love | bathroom | storm |
| air | love | young | night | sun |
| travel | amaze | age | door | warm |
| land | tip | son | comfort | degree |
| seat | definite | adult | book | cloud |

As Table 1 demonstrates, local topics characterize tourism styles and corresponding locations, including styles related to nature like desert (local #23), and seaside (local #62), as well as cultural styles like museum (local #57); whereas global topics correspond to common themes of travel, such as transportation (global #8), accommodation (global #26), and opinion (global #19), which tend to appear in travelogues related to almost any destination.

In several embodiments, to exemplify relationships between local topics and locations, a visualization service, such as the Many Eye™ visualization service, may be used to visualize the spatial distribution of local topics. Based on the LT model, the correlation between a local topic z and a location l is measured by the conditional probability $p(z|l)$, which is equal to $\psi_l$, location l's distribution over local topics.

FIG. 5A, illustrates a geographic distribution of a local topic (#57 museum from Table 1) plotted on a map of the United States. A higher conditional probability $p(z|l)$ is reflected by a state being shaded darker.

Similarly, FIG. 5B illustrates a geographic distribution of a local topic (#62 seaside from Table 1) plotted on a map of the United States. As with FIG. 5A, higher conditional probability $p(z|l)$ is reflected by a state being shaded darker.

The maps of FIGS. 5A and 5B both show uneven geographic distributions of local topics, indicating the high dependence between local topics and locations. FIG. 5A demonstrates that New York, Illinois, and Oklahoma are more likely destinations for travel related to {museum, art, etc.} as compared to other states. Similarly, FIG. 5B demonstrates that Hawaii shows the highest correlation with {dive, snorkel, etc.}, while California and Florida are also likely destinations for travel related to diving, snorkeling, etc.

Figure 6:
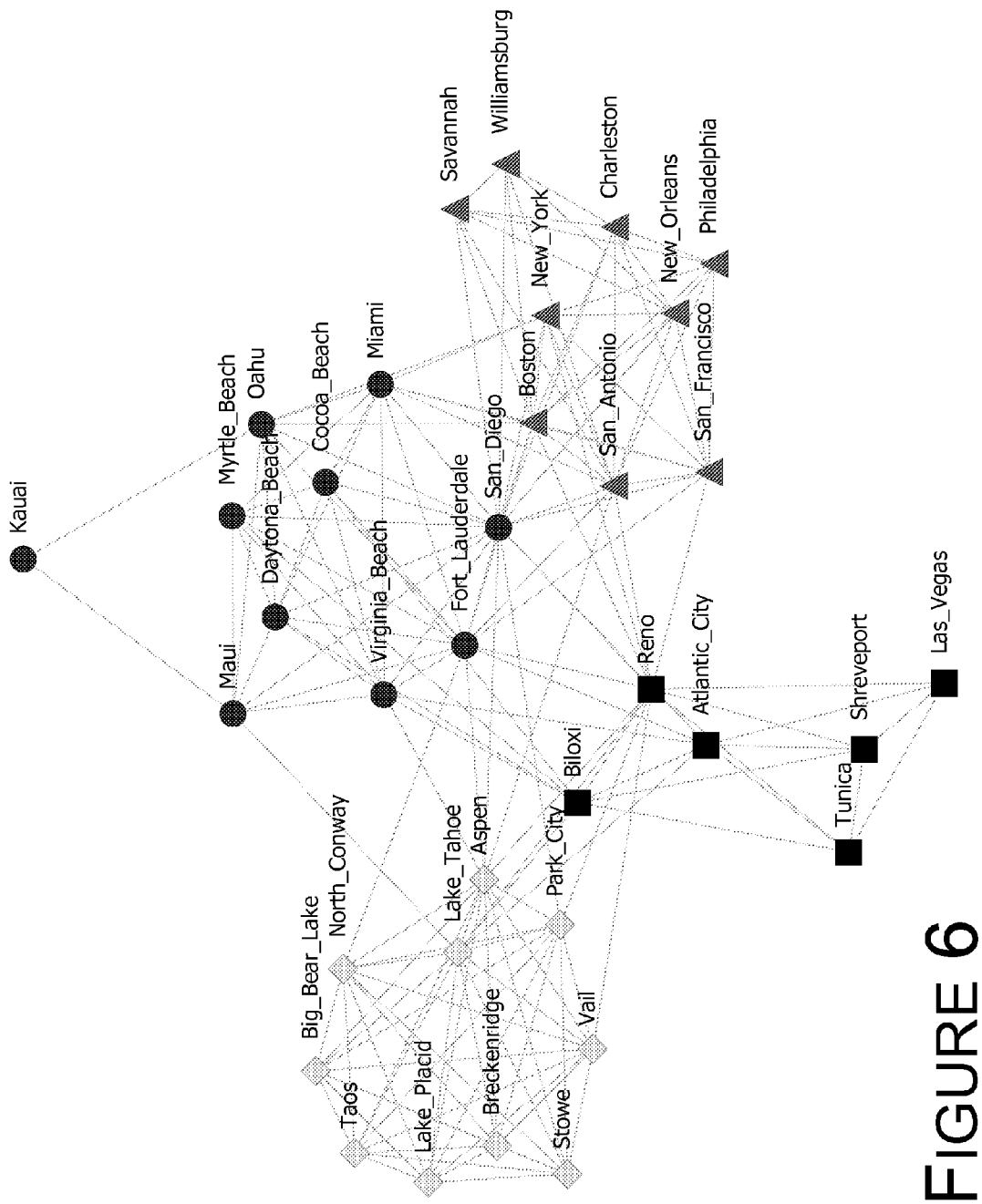
FIG. 6 is a location similarity graph generated by a local topic decomposition model.

FIG. 6 shows an example of a location similarity graph of location-related aspects mined from travelogues. The similarity graph illustrated in FIG. 6 represents a set of 36 locations built for four travel intentions. The locations were selected from a source and filtered against a test data set. The four travel intentions include (1) Beaches and Sun, (2) Casinos, (3) History and Culture, and (4) Skiing. The location set included six locations for Casinos, and 10 for each of Beaches and Sun, History and Culture, and Skiing. For each pair of locations in the set, a similarity was computed as described above. The pair-wise similarities form the location similarity graph presented in FIG. 6.

To demonstrate the graph's consistency with the ground-truth similarity/dissimilarity between the four categories of locations, a visualization service may be used to visualize a graph. In the implementation illustrated in FIG. 6, a visualization service, such as that provided by NetDraw™ software, was used to visualize a graph (not shown) where similar locations tend to be positioned close to each other. Ground-truth similarity may be confirmed from third-party sources during training of the LT model.

In the illustrated example, different shapes represent different location categories. Specifically, locations corresponding to (1) Beaches and Sun are represented with circles; locations corresponding to (2) Casinos are represented with squares; locations corresponding to (3) History and Culture are represented with triangles; and locations corresponding to (4) Skiing are represented with diamonds. FIG. 6 shows how different categories of locations are visibly differentiated and clustered by the similarity metric of the LT model.

As shown by the example location similarity graph, tools and techniques for mining location-related aspects from travelogues provide a benefit from other methods including uncluttered data. For example, although a location similarity graph generated using a term frequency-inverse document frequency (TF-IDF) method may show differentiation, under the TF-IDF metric, clustering is not complete. When generating a TF-IDF based location similarity graph for comparison with that of the tools for mining location-related aspects from travelogues as described with regard to FIG. 6, the TF-IDF based graph is implemented by forming a pseudo document for each location, concatenating all the travelogues that refer to a particular location, and then measuring the similarity between two locations using TF-IDF cosine distance.

The approach described for comparison to such a TF-IDF based graph demonstrates one of the advantages of the LT model, e.g., preserving the information that characterizes and differentiates locations when projecting travelogue data into a low-dimensional topic space. Moreover, greatly reduced edge count is obtained by the LT model. As shown in FIG. 6, the LT model-based graph produces about 330 edges, as compared to a corresponding TF-IDF based graph (not shown), which produces about 1256 edges. The edge count provides an indication of the number of computations performed. Thus, the edge count decrease of about 70% indicates that computational time is significantly reduced by the LT model.

The LT model leverages query expansion over local topics. Using the four location categories discussed above ((1) Beaches and Sun, (2) Casinos, (3) History and Culture, (4) Skiing) and the term "family," five queries were served as individual requests to the LT model to obtain a relevance-oriented recommendation. Table 2, below shows ranking results obtained by the LT model and a baseline method employing TF-IDF. The baseline method ranks locations for a query as a decreasing number of travelogues that contain both a location and a query term. Ground-truth represents a known true quantity for training.

The resulting location ranking lists of the two methods are evaluated by the number of locations, within the top K locations, matching the ground-truth locations. As shown by the experimental results in Table 2, the locations recommended via the LT model correspond with more of the ground-truth location categories than the baseline method. The difference is particularly evident for the requests "beach" and "casino."

TABLE 2

| Query | #Groundtruth | Method | #Matches at top K | | | |
| --- | --- | --- | --- | --- | --- | --- |
| | | | K = 5 | K = 10 | K = 15 | K = 20 |
| beach | 35 | baseline | 1 | 4 | 7 | 9 |
| | | LT model | 4 | 9 | 12 | 13 |
| casino | 6 | baseline | 2 | 2 | 3 | 3 |
| | | LT model | 4 | 5 | 5 | 5 |
| family | 38 | baseline | 4 | 6 | 8 | 11 |
| | | LT model | 3 | 5 | 8 | 11 |
| history | 12 | baseline | 4 | 6 | 8 | 8 |
| | | LT model | 5 | 8 | 9 | 10 |
| skiing | 20 | baseline | 2 | 4 | 4 | 6 |
| | | LT model | 3 | 5 | 10 | 12 |

However, the baseline method corresponds with more of the ground-truth locations for the request "family" at the top 5 and top 10 results. This provides evidence that the LT model's method for measuring a location's relevance to a query term occurs in local topic space rather than in term space. The LT model expands the query with similar terms to enable partial match and improve the relevance measurement for queries that are well captured by local topics (e.g., beach, casino). On the other hand, for query terms mainly captured by global topics (e.g., family, which is a top word of the global topic #22 shown in Table 1), the query expansion employed by the LT model is less effective due to a low confidence of that query term's distribution over local topics.

Table 3 lists some example destinations recommended by the LT model from the experimental results of Table 2. Correspondence between the results of the LT model and the ground-truth is demonstrated by the locations presented in italics.

TABLE 3

| Query | Top 10 recommended destinations |
| --- | --- |
| beach | Myrtle Beach, Maui, Miami, Santa Monica, Destin, Hilton Head Island, Virginia Beach, Daytona Beach, Key West, San Diego |
| casino | Las Vegas, Atlantic City, Lake Tahoe, Biloxi, Reno, Deadwood, New Orleans, Detroit, Tunica, New York City |
| family | Orlando, Las Vegas, New York City, Washington D. C., New Orleans, Charleston, Myrtle Beach, Chicago, San Francisco, Walt Disney World |
| history | New Orleans, Charleston, Williamsburg, Washington D.C., New York City, Chicago, Las Vegas, Philadelphia, San Francisco, San Antonio |
| skiing | Lake Tahoe, Park City, South Lake Tahoe, Jackson Hole, Vail, Breckenridge, Winter Park, Salt Lake City, Beaver Creek, Steamboat Springs |

Table 3 reveals a further strength of the tools and techniques for mining location-related aspects from travelogues. Specifically, while the destinations represented by the ground-truth are limited to cities, the LT model captures destinations based on attraction names (e.g., Walt Disney World) and regional names or nicknames (e.g., South Lake Tahoe).

Note, although single word queries were used for uniformity in the example illustrated in Table 2 and Table 3, the tools for mining location-related aspects from travelogues operate on multi-word requests as well.

Example Operation

Probabilistic topic models are a type of dimension reduction approach useful in information retrieval (IR) that may be understood in terms of matrix factorization approaches. Although the computations of topic models are more complex than matrix factorization approaches, matrix factorization approaches may facilitate understanding of the probabilistic topic model. Additionally, matrix factorization approaches may be generalized to unseen data, e.g., query data. The "topic" of topic models is equivalent to the base vector in matrix factorization approaches. However, compared to matrix factorization approaches, topic models provide better insight to real world queries. Nevertheless, the analogousness of matrix factorizations and topic models enables better understanding of file decomposition implementation by various approaches and heuristics.

Existing probabilistic topic models, such as latent Dirichlet allocation (LDA), have been successfully applied to a variety of text mining tasks. The existing probabilistic models are not applicable in the vertical space of travelogues because the existing models do not address the limitations of travelogue data. Although documents under known probabilistic models are represented as mixtures of discovered latent topics, the entities appearing in the documents (e.g., locations mentioned in travelogues) either lack representation in the topic space, or are represented as mixtures of all topics, rather than the topics appropriate to characterize these entities. Considering the common topics in travelogues, the representation of locations using all topics would be contaminated by noise and thus unreliable for further relevance and similarity metrics.

As described above with reference to FIG. 1, knowledge mining operations 102 are performed to obtain location-representative knowledge 106 from user-generated travelogues 104. As discussed above, location extraction 102(A) decomposes travelogues 104 to extract locations and travelogue modeling 102(B) trains a Location-Topic (LT) model on locations extracted from travelogues 104 to learn local and global topics, as well as to obtain representations of locations in the local topic space.

Figure 7:
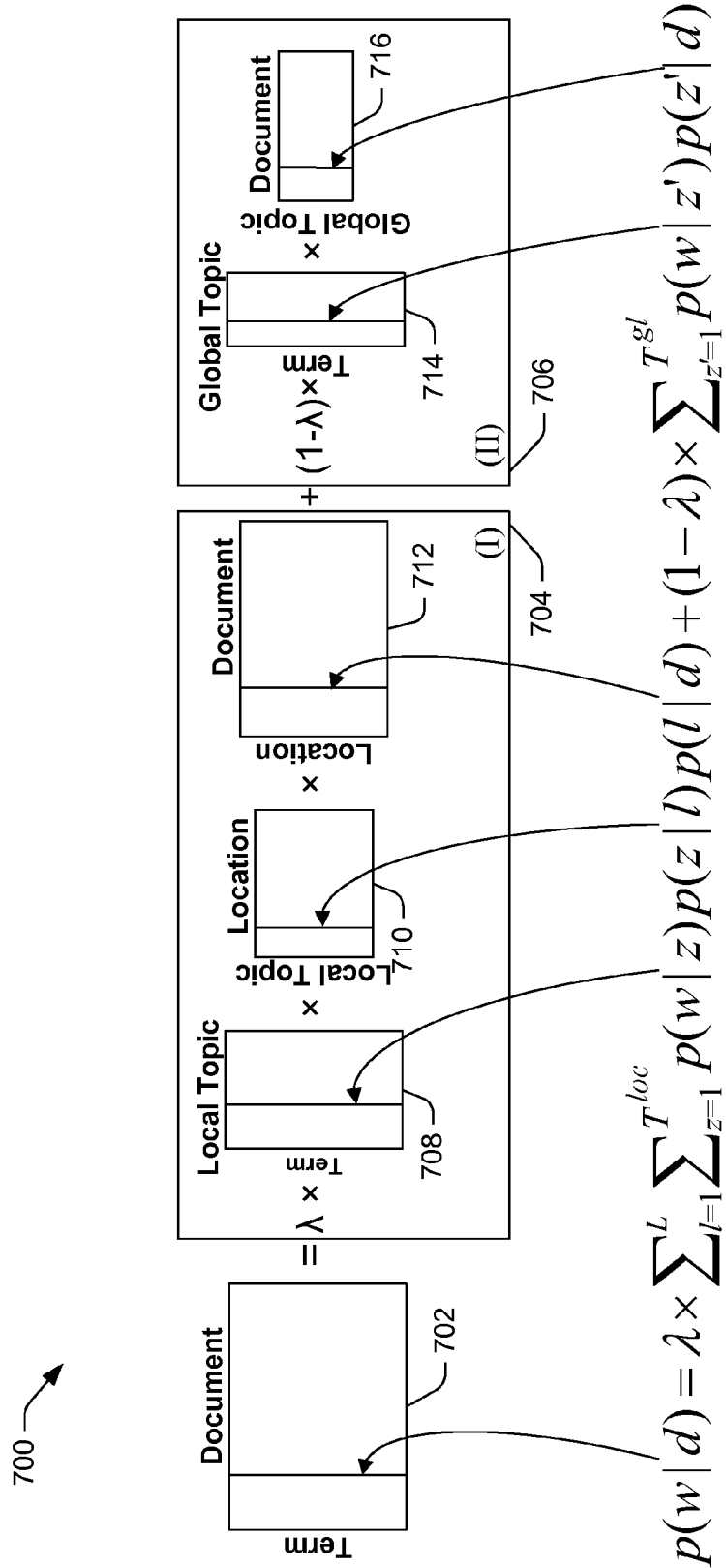
FIG. 7 is a matrix representation of an example of a decomposition model used to mine topic-related aspects from user-generated content comprising travelogues.

FIG. 7 illustrates an example matrix representation of decomposition of user generated content such as a travelogue. Such decomposition is completed as part of knowledge mining operations 102 in various implementations. By decomposing the file, location-representative knowledge is obtained from terms in the local topics. In at least one implementation, terms from global topics are discarded; however the terms of local topic and representing locations can be compactly represented and efficiently indexed.

Travelogues 104 are represented by a term-document matrix at 702, where the $j^{th}$ column encodes the $j^{th}$ document's distribution over terms. Based on this representation, a given term-document matrix 702 is decomposed into multiple matrices. A file, e.g., travelogue, is represented by local topics illustrated in the (I) box 704 and global topics illustrated in the (II) box 706. The matrices addressing local topics 704 include Term-LocalTopic matrix 708, LocalTopic-Location matrix 710, and Location-Document matrix 712. The matrices addressing global topics 706 include Term-Global-Topic matrix 714, and GlobalTopic-Document matrix 716.

The term-document matrix 702 is decomposed into Term-LocalTopic matrix 708, Term-GlobalTopic matrix 714, LocalTopic-Location matrix 710, GlobalTopic-Document matrix 716 and Location-Document matrix 712. Global-Topic-Document matrix 716 represents a common topic model, whereas Location-Document matrix 712 is specific to the LT model. A graphical illustration of the LT model is presented in FIG. 9, described below.

In at least one embodiment, travelogues 104 are represented by a term-document matrix 702 that is decomposed as represented by FIG. 7 in accordance with the following equation, Equation 1.

$$p(w|d) = \lambda \times \sum_{l=1}^{L} \sum_{z=1}^{T^{loc}} p(w|z)p(z|l)p(l|d) + $$
$$(1-\lambda) \times \sum_{z'=1}^{T^{gl}} p(w|z')p(z'|d)$$

Equation (1)

In Equation 1, p(w|d) indicates that each word w in document d has an associated probability p. Between 604 and 606, the distribution is binary—each word w in document d either contributes to local topics z, 704, or global topics z', 706. Local topic z has a probability of representing one or more locations l. When explicitly represented, a location l may be extracted from local topics z. Location l may also be learned from local topic z. The sum of extracted and learned locations l represent document d. Each location l has a probability of representing document d.

In some instances observed information such as existing location labels, (e.g., user-submitted tags, generated tags, etc.), associated with a travelogue may be employed to build the Location-Document matrix 612. However, due to such document-level labels typically being too coarse to cover all the described locations in travelogues, or even incorrectly marked, extracting locations from travelogue text may be preferred. There are several methods for location extraction, e.g., looking up a gazetteer, or applying a Web service like Yahoo Placemaker™. In several implementations an extractor based on a gazetteer and location disambiguation algorithms considering geographic hierarchy and textual context of locations are used to unambiguously identify location names even when the location names may also have common word meanings that are not location associated or when the location name may be associated with more than one location.

For example, a word or phrase may be identified as either a location name or a common word. Differentiating between location names and common words may be referred to as location detection. Location detection can use prior knowledge of the probability of a word being a location name or else being a common word that is not location associated. In some instances such probabilities may be collected from a corpus of many pieces of user-generated content, documents or articles.

As another example, a location name that may be associated with several geographic locations may be disambiguated to only the intended location instance. This disambiguation may be referred to as location recognition. Location recognition may predict the intended location instance of a location name using hints from other location names occurring within the same piece of user-generated content. In at least one implementation, results from location recognition may be used to validate results from location detection. For example, if several location names are found near a word W within a travelogue, it is more likely that the word W is a location name than a common word.

In some implementations, the operations of location detection and location recognition may be coupled with one another to extract or identify location names from textual content.

The extracted locations can provide an indication of locations described in a travelogue. However, such extracted locations are not sufficient to complete the Location-Document matrix 712 due to an observed gap between the extracted locations and the locations actually described in the travelogue. For instance, a series of locations may be mentioned in a trip summary, without any description or with minimal description in the text of the travelogue. The tools and techniques for mining location-related aspects from travelogues leverage the fact that travelogue authors typically concentrate descriptions of some locations in consecutive sentences. That is, consecutive words tend to correspond to the same location. Considering these observations, all of the words in a segment (e.g., a document, paragraph, sentence, or sliding window) may be treated as sharing a multinomial distribution over locations, which is affected by a Dirichlet prior derived from the extracted locations in the segment. In this way, the Location-Document matrix 712 is kept variable to better model the data, while also benefiting from the extracted locations as priors.

As shown in FIG. 7, for the decomposition of probability p(w|d) in Equation 1, each word in a document is assumed to be "written" in either of the following two ways: (1) selecting a location, a local topic, and a term in sequence; (2) selecting a global topic and a term in sequence. A binary decision is made to select between (1) and (2) for each word. Once decomposed as above, the Location Topic (LT) model preserves a travelogue collection's location-representative knowledge in LocalTopic-Location matrix 710, and topics in Term-LocalTopic matrix 708 and Term-GlobalTopic matrix 714. In at least one implementation, travelogue topics are preserved via Term-LocalTopic matrix 708, sometimes in combination with Term-GlobalTopic matrix 714.

Figure 8:
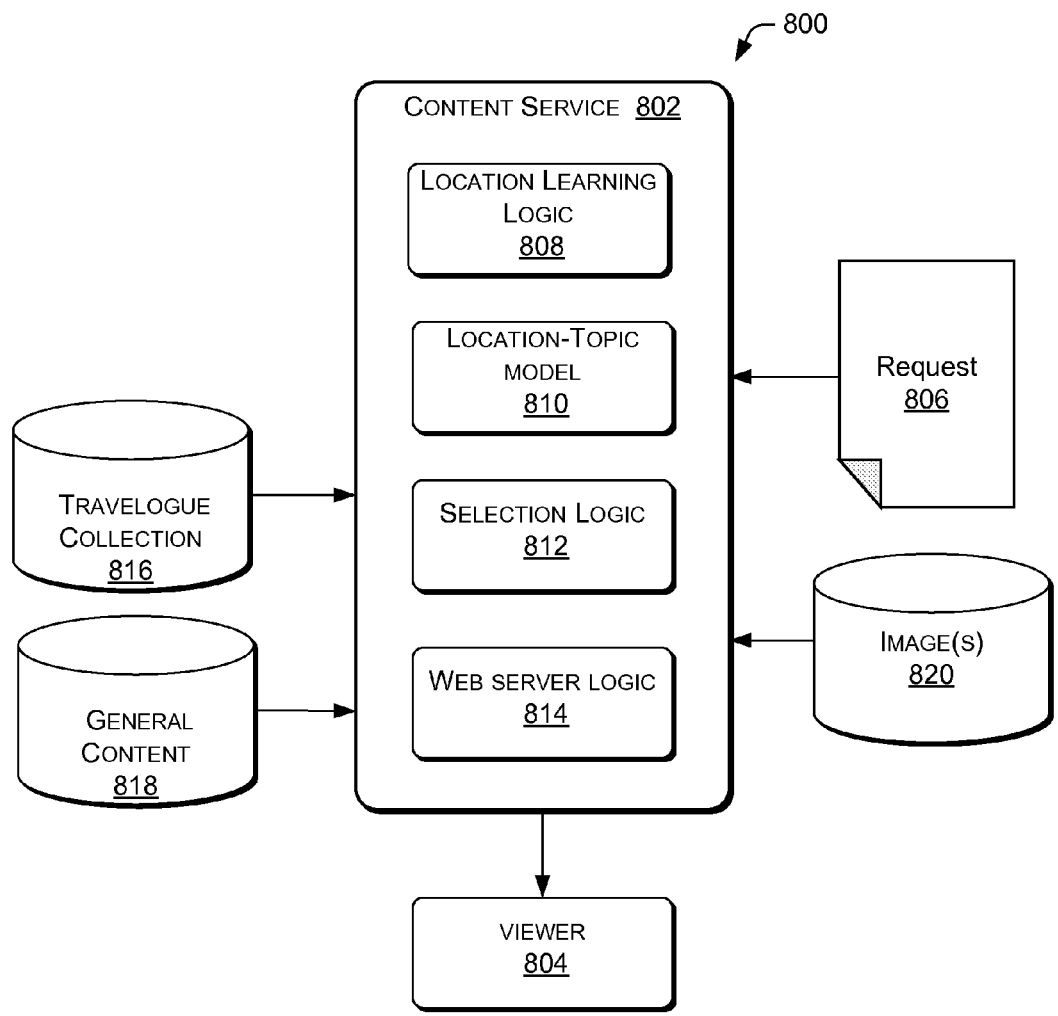
FIG. 8 is a system diagram showing illustrative logical relationships for mining topic-related aspects from user-generated content comprising travelogues.

FIG. 8 shows a system 800 that serves mined knowledge. Data is obtained by mining topic-related aspects from user generated content such as travelogues, and may be provided to the user through various applications such as destination recommendation application 302, destination summarization application 304, and travelogue enrichment application 306.

System 800 includes a content service 802 that provides search results through a viewer 804, oftentimes in response to a request 806. Content service 802 may be implemented as a network-based service such as an Internet site, also referred to as a website. The website and its servers have access to other resources of the Internet and World-Wide-Web, such as various content and databases.

In at least one implementation, viewer 804 is an Internet browser that operates on a personal computer or other device having access to a network such as the Internet. Various browsers are available, such as Microsoft Corporation's Internet Explorer™. Internet or web content may also be viewed using other viewer technologies such as viewers used in various types of mobile devices, or using viewer components in different types of application programs and software-implemented devices.

In the described embodiment, the various devices, servers, and resources operate in a networked environment in which they can communicate with each other. For example, the different components are connected for intercommunication using the Internet. However, various other private and public networks might be utilized for data communications between entities of system 800.

In system 800, content service 802, which is coupled to viewer 804, serves content responsive to a request 806. Content service 802 utilizes one or more of location learning logic 808, Location-Topic (LT) model 810, selection logic 812, and web server logic 814 to obtain content from travelogue collection 816, general content 818, and images 820.

Location learning logic 808 decomposes a file, e.g., a travelogue or a blog, into multiple components, one for local topics from which location-representative knowledge is obtained, and another for global topics that do not pertain to location and may be filtered out.

Location learning logic 808 represents functionality for decomposing files into local and global topics or components. Although the described embodiment discusses mining location-related aspects from travelogues, the techniques described herein are also useful for, among other things, determining search results for web pages, multimedia files, etc.

In various embodiments the request 806, is used by location learning logic 808. Request 806 can represent a single request or a plurality of requests. Furthermore, request 806 may come from multiple sources. For example, a request 806 may come from a location mined from the Internet, user generated content such as a document written by a user, a web page visited by a user, and/or an image such as a photo taken by a user. Images 820 may also include images from other sources including scanned images, images downloaded or obtained from the Internet, images obtained from other users, etc.

The LT model 810 is shown as a component of content service 802. In various embodiments, the LT model 810 operates in concert with one or more of location learning logic 808, selection logic 812, and web server logic 814. Alternately or additionally, LT model 810 may operate independent of the other components illustrated in content service 802.

LT model 810 facilitates discovering topics from travelogues and virtually simultaneously representing locations with appropriate topics. As discussed above, discovered topics include two types of topics, local topics which characterize locations from the perspective of travel (e.g., sunset, cruise, coastline), and global topics (e.g., hotel, airport) which do not particularly characterize locations but rather extensively co-occur with various locations in travelogues.

Based on the LT model 810, decomposing travelogues into local and global topics facilitates automatically obtaining location-representative knowledge from local topics, while other semantics captured by global topics are filtered out. The LT model 810 also enables representing a location as a mixture of local topics mined from a travelogue collection, which facilitates automatically summarizing multiple view-points of a location. Moreover, based on learned location representation in local topic space of the LT model 810, quantitative measurement of both the relevance of a location to a given travel idea and similarity between locations is made possible.

For example, when request 806 is a request for a location, relevant results to be mined may be determined based on an intersection of the location itself using LT model 810. With requests for characteristics of locations, (e.g., beach, tropical, ocean, etc.), relevant results to be mined may be determined based on an intersection of the characteristics and associated locations using LT model 810.

Selection logic 812 selects content based on the determination of location learning logic 808 corresponding to request 806. In at least one embodiment, selection is made from travelogue collection 816.

Web server logic 814, in some instances, responds to various requests such as requests from viewer 804 and/or request 806 by providing appropriate content. In various embodiments, the request 806 is used by web server logic 814 rather than, or in addition to, location learning logic 808. Microsoft's IIS (Internet Information Services) is an example of widely used software that might be used in this example to implement web server logic 814. For example, web server logic 814 receives a request 806, and accesses various types of content, including general content 818, travelogue content from a travelogue collection 816, and images 820. Depending on the nature of the service implemented by content service 802, various combinations and types of content may be accessed, including text, graphics, pictures, video, audio, etc. The exact nature of the content is determined by the objectives of the service. In various implementations, selection logic 812 operates with web server logic 814 to facilitate selection from travelogue collection 816, general content 818, or other sources of content. Such selection may be accomplished by searching for records referring to a location corresponding to the request, ranked based on the local topics or other location mining techniques as described herein.

In this context, a request 806 might comprise a location and/or a characteristic of locations, and may be supplied by a user of content service 802. General content 818 might comprise documents, multimedia files and other types of content that are provided to viewer 804 via content service 802. For example, if content service 802 represents a search service, content service 802 may include various other features in addition to searching, such as discussion, chat, and news features.

Content service 802 may generate a response to request 806 based on data retrieved from one or more third-party sources. FIG. 8 shows a collection of travelogue content 816 as an example of such sources. When serving content to viewer 804 in response to request 806, content service 802 may retrieve one or more records from travelogues 104, which may be embodied as a candidate set or subset of travelogue collection 816, or in some instances, a compound representation of travelogues 104 having undergone dimension reduction.

Figure 9:
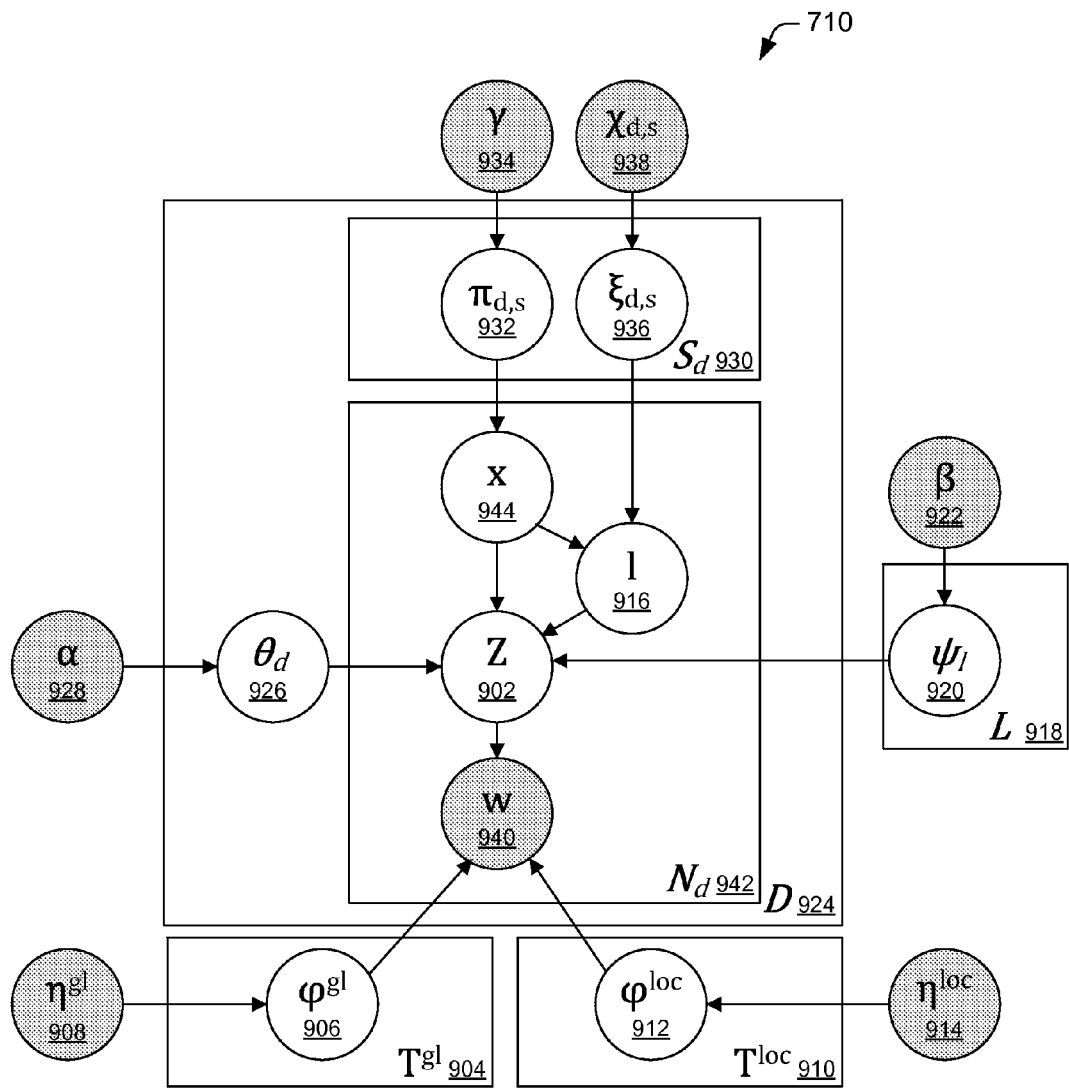
FIG. 9 is a block diagram of an example probabilistic topic decomposition model (DM).

FIG. 9 presents a graphical representation of a mined topic probabilistic decomposition model, e.g., the Location-Topic (LT) probabilistic decomposition model introduced above with reference to 700 of FIG. 7 and implemented as Location-Topic model 810, shown in FIG. 8.

In the LT model 810, each location l is represented by $\psi_l$, a multinomial distribution over local topics, with symmetric Dirichlet prior $\beta$; while each document d is associated with a multinomial distribution over global topics, denoted by $\theta_d$, with symmetric Dirichlet prior $\alpha$.

To obtain a similarity-oriented recommendation in accordance with the similarity criterion, given a set of candidate destinations $\mathcal{L}$ and a query location $l_q$ (e.g., "Honolulu"), each destination $l \in \mathcal{L}$ is determined to have a similarity to $l_q$ in the local topic space. The similarity is defined as LocSim. Moreover, whatever the given query, every destination has an intrinsic popularity which is accounted for by the destination recommendation application represented by 302. Intrinsic popularity is approximated by how often a destination is described in travelogues. As the newest travelogues are collected from the Web, intrinsic popularity is kept updated to reflect travel trends.

A destination recommendation application, such as that represented by destination recommendation application 302 discussed above with regard to FIG. 3, computes a rank score for recommendation, $\text{Score}_{l_q}(l)=\log \text{LocSim}(l_q,l)+\lambda \log \text{Pop}(l)$, $l \in \mathcal{L}$, $\lambda \geq 0$, where the coefficient $\lambda$ controls the influence of the static popularity Pop(l) in ranking. In at least one implementation, (l) is defined as the occurrence frequency of the location l in the whole travelogue corpus C, as $$(l) = \frac{\#(l \text{ appears in } C)}{\sum_{l' \in \mathcal{L}} \#(l' \text{ appears in } C)}.$$

To obtain a relevance-oriented recommendation in accordance with the intention criterion, given a travel intention described by a term $w_q$ (e.g., "hiking"), the destination recommendation application ranks destinations in terms of relevance to the query. Travel intention contains more semantics than a single term such as $w_q$. Thus, in various implementations, to provide a comprehensive representation to the travel ideal, the destination recommendation application expands $w_q$ in the local topic space as $\delta_{w_q}$, (a distribution over the local topics). In this way, the relevance of each location l to the query $w_q$ is automatically measured using Kullback-Leibler (KL)-divergence. The score for ranking is computed as $\text{Score}_{w_q}(l) = -D_{KL}(\delta_{w_q}\|\psi_l) + \lambda \log \text{Pop}(l)$, $l \in \mathcal{L}$, $\lambda \geq 0$, where $\psi_l$ is location l's distribution over local topics. The above query expansion strategy supports more complex travel intentions, and enables operation on multiword or natural language queries in several implementations.

For a given location $l_q$, in knowledge mining operations 102 such as those discussed above with regard to FIG. 1, the LT model 810 ranks the terms {w=1:W} with the probability (w|$l_q$). Those terms with higher probabilities of serving as representative tags are selected for the location l. In at least one implementation, given a selected tag $w_q$, the LT model 810 generates corresponding snippets via ranking all the sentences {s} in the travelogues 104 according to the query "$l_q+w_q$". For example, $\mathcal{L}_s$ is treated as the set of locations extracted from the sentence s and $W_s$ is treated as all the terms in s. From $\mathcal{L}_s$, s, and $W_s$ the sentence is ranked in terms of geographic relevance to a location $l_q$ as $\text{Score}_{l_q,w_q}(s) \times \text{GeoRele}_{l_q}(s) \times \text{SemRele}_{w_q}(s)$, where $\text{GeoRele}_{l_q}(s) = \#(l_q \text{ appears in } \mathcal{L}_s)/|\mathcal{L}_s|$. Correspondingly the sentence is ranked in terms of semantic relevance to a tag $w_q$, $\text{SemRele}_{w_q}(s) = \sum_{w \in W_s} \text{TermSim}(w_q,w)/\log(1+|W_s|)$. Using the above techniques each term in a sentence contributes to semantic relevance according to similarity $w_q$.

For example, given a travelogue d, which refers to a set of locations $\mathcal{L}_d$, the LT model 810 treats informative depictions of locations in $\mathcal{L}_d$ as highlights. Each term w in d has a possibility (l|w) to be assigned to a location l. In this way, the highlight of the location l may be represented with a W-dimensional term-vector $u_l=(u_{l,1}, \ldots, u_{l,w})$ where $u_{l,w}=\#(w \text{ appears in } d) \times p(l|w)$, w=1, ..., W. Highlight $u_l$ is enriched with related images by collecting a set of images $R_l$ that are geographically relevant to the location l. Each image r$\in R_l$ is labeled with a set of tags, $T_r$. Based on the tags, each image r can also be represented as a W-dimensional vector $v_r=(v_{r,1}, \ldots, v_{r,W})$, where $v_{r,w}=\sum_{t \in T_r} \text{TermSim}(t,w)$, w=1, ..., W.

A relevance score of r to $u_l$ is computed as $$\text{Score}_{u_l}(r) = \langle u_l, v_r \rangle \cdot \frac{1}{\log(1+|T_r|)},$$

r$\in R_l$, where $\langle \cdot, \cdot \rangle$ denotes an inner product, and $$\frac{1}{\log(1+|T_r|)}$$

is used to normalize images with different numbers of tags. Moreover, to diversify the resulting images, images are selected one by one. Once the $k^{th}$ image $r_k$ is chosen, $u_l^{(k)}$ is iteratively updated to decay information already expressed by the selected image, as $u_l^{(k)} = \{u_{l,w}^{(k-1)} \times \exp(-\tau \cdot v_{r_k,w})\}_{w=1}^W$, and $u_l^{(0)} = u_l$, where $\tau > 0$ is a penalty coefficient to control the decay strength.

In at least one implementation, location learning logic 708 treats document d using a bag-of-words approach, as a set of $S_d$ non-overlapping segments, (e.g., a document, paragraph, sentence, or sliding window). Each segment s is associated with (a) a bag-of-words, (b) a binomial distribution over global topics versus local topics, and (c) a multinomial distribution over a location set corresponding to segment s. The binomial distribution over global topics versus local topics $\pi_d$, has Beta prior $\gamma=\gamma^{gl},\gamma^{loc}$. The multinomial distribution $\xi_d$, over segment s's corresponding location set $$\mathcal{L}_{d,s} \stackrel{def}{=} \{l \mid l \text{ appears in segment } s \text{ in } d\},$$

and has Dirichlet prior parameterized by $\chi_{d,s}$ defined as $$\chi_{d,s} \stackrel{def}{=} \{\delta_{d,s,l} = \mu \cdot \#(l \text{ appears in segment } s \text{ in } d)\}_{l \in \mathcal{L}_{d,s}},$$

where "#(·)" is short for "the number of times" and coefficient $\mu$ denotes the precision of the prior. In at least one implementation, each paragraph in a travelogue is treated as a raw segment, with further merging to ensure that each segment contains at least one location. In accordance with FIG. 9, a generative process of a travelogue collection C, which consists of D documents covering L unique locations and W unique terms, is defined graphically as follows.

At 902 when z represents a global topic, for each global topic z$\in\{1, \ldots,\}$, a multinomial distribution over terms, $\phi_z^{gl} \sim \text{Dir}(\eta^{gl})$ is drawn, where $T^{gl}$ is represented at 904, $\phi^{gl}$ is represented at 906, and $\eta^{gl}$ is represented at 908. However, when z represents a local topic, for each local topic z$\in\{1, \ldots, ^{loc}\}$, a multinomial distribution over terms, $\phi_z^{loc} \sim \text{Dir}(\eta^{loc})$ is drawn, where $T^{loc}$ is represented at 910, $\phi^{loc}$ is represented at 912, and $\eta^{loc}$ is represented at 914. $T^{gl}$ corresponds to Term-GlobalTopic matrix 714 and $T^{loc}$ corresponds to Term-LocalTopic matrix 708 shown in FIG. 7.

At 916, l represents a location. For each location l$\in\{1, \ldots, L\}$, a multinomial distribution over local topics, $\psi_l \sim \text{Dir}(\beta)$ is drawn, where L is represented at 918, $\psi_l$ is represented at 920, and $\beta$ is represented at 822. $\psi_l$ corresponds to LocalTopic-Location matrix 710, shown in FIG. 7.

At 924, D represents an end document in a series. For each document d$\in\{1, \ldots, D\}$, a multinomial distribution over global topics, $\theta_d \sim \text{Dir}(\alpha)$ is drawn, where $\theta_d$ is represented at 926 and $\alpha$ is represented at 928. $\theta_d$ corresponds to Global-Topic-Document matrix 716, shown in FIG. 7.

At 930, $S_d$ represents a segment of a document. For each segment s of document d, a binomial distribution over global topics versus local topics, $\pi_{d,s} \sim \text{Beta}(\gamma)$, is drawn, where $\pi_{d,s}$ is represented at 932 and $\gamma$ is represented at 934. $\pi_{d,s}$ controls the ratio of local to global topics in a document. Additionally, for each segment s of document d, a multinomial distribution over locations in s, $\xi_{d,s} \sim \text{Dir}(\chi_{d,s})$, is drawn, where $\xi_{d,s}$ is represented at 936 and $\chi_{d,s}$ is represented at 938. $\xi_{d,s}$ controls which location is addressed by Location-Document matrix 712 shown in FIG. 7.

At 940, w represents a word from a number of words N in a document d. For each word $w_{d,n}$ in segment s of document d, a binary switch, $x_{d,n} \sim \text{Binomial}(\pi_{d,s})$, is drawn, where $N_d$ is represented at 942, and x is represented at 944.

The LT model 810 uses switch variable x, 944, to control the assignment of words w, 940 as either a local topic $T^{loc}$ 910 or a global topic $T^{gl}$ 904.

Parameters of the LT model support a variety of applications by providing several data representations and metrics including a representation of a location, a location similarity metric, a term similarity metric, and inference.

Regarding location representation, a location l can be represented in either $T^{loc}$-dimensional local topic space or W-dimensional term space. For a $T^{loc}$-dimensional local topic space, location l is represented by $\psi_l$ namely its corresponding multinomial distribution over local topics. For a W-dimensional term space, a probability distribution over terms conditioned on location l is derived from raw Gibbs samples rather than the model parameters, by counting the words assigned to location l, as $p(w|l) \propto n_l^w$, $w=1, \ldots, W$, where $n_l^w$ is the number of times term w is assigned to location l.

Regarding location similarity metrics, from the perspective of tourism, the symmetric similarity between two locations $l_1$ and $l_2$ is measured based on corresponding multinomial distributions over local topics $\psi_{l_1}$ and $\psi_{l_2}$ as $\text{LocSim}(l_1, l_2) = \exp\{-\tau D_{JS}(\psi_{l_1} \| \psi_{l_2})\}$, where $D_{JS}(\cdot \| \cdot)$ denotes a Jensen-Shannon (JS) divergence defined as $$D_{JS}(p \| q) = \frac{1}{2} D_{KL}\left(p \| \frac{p+q}{2}\right) + \frac{1}{2} D_{KL}\left(q \| \frac{p+q}{2}\right).$$

$D_{KL}(\cdot \| \cdot)$ denotes the Kullback-Leibler (KL) divergence, and coefficient $\tau > 0$ is used to normalize different numbers of local topics.

Regarding term representation, each term w in the vocabulary of the travelogue collection can be expanded to a probability distribution over the learned $T^{loc}$ local topics, denoted by $\delta_w$ shown by $\{\delta_w = \{p(z|w)\}_{z=1}^{T^{loc}}, p(z|w) \propto p(w|z)p(z) \propto \phi_{z,w}^{loc} \eta_z^{loc}$, where $\eta_z^{loc}$ is the total number of words assigned to local topic z.

Regarding term similarity metrics, from the perspective of tourism, the symmetric similarity between two terms $w_1$ and $w_2$ is measured based on corresponding probability distributions over local topics as $\text{TermSim}(w_1, w_2) = \exp\{-\tau D_{JS}(\delta_{w_1} \| \delta_{w_2})\}$.

Regarding inference, given the learned parameters, hidden variables can be inferred for unseen travelogues. A Gibbs sampler is run on the unseen document d using updating formulas. In at least one embodiment the following updating formulas are used.

$$p(x_i = gl, z_i = z | w_i = w, x_{\backslash i}, z_{\backslash i}; \Omega) \propto \phi_{z,w}^{gl} \cdot \frac{n_{d,\backslash i}^{gl,z} + \alpha}{n_{d,\backslash i}^{gl} + T^{gl}\alpha} \cdot (n_{d,s,\backslash i}^{gl} + \gamma^{gl}),$$

$$z = 1, \ldots, T^{gl}$$

$$p(x_i = loc, l_i = l, z_i = z | w_i = w, x_{\backslash i}, l_{\backslash i}; \Omega) \propto$$

$$\phi_{z,w}^{loc} \cdot \psi_{l,z} \cdot \frac{n_{d,s,\backslash i}^{l} + \chi_{d,s,l}}{n_{d,s,\backslash i}^{loc} + \chi_{d,s}} \cdot (n_{d,s,\backslash i}^{loc} + \gamma^{loc}),$$

$$z = 1, \ldots, T^{loc}$$

After collecting a number of samples, a distribution over locations for each term w appearing in document d can be inferred by counting the number of times w is assigned to each location l as $$p(l | w) = \frac{\#(w \text{ appears in } d \text{ and is assigned to } l)}{\#(w \text{ appears in } d)}.$$

Example Process

Figure 10:
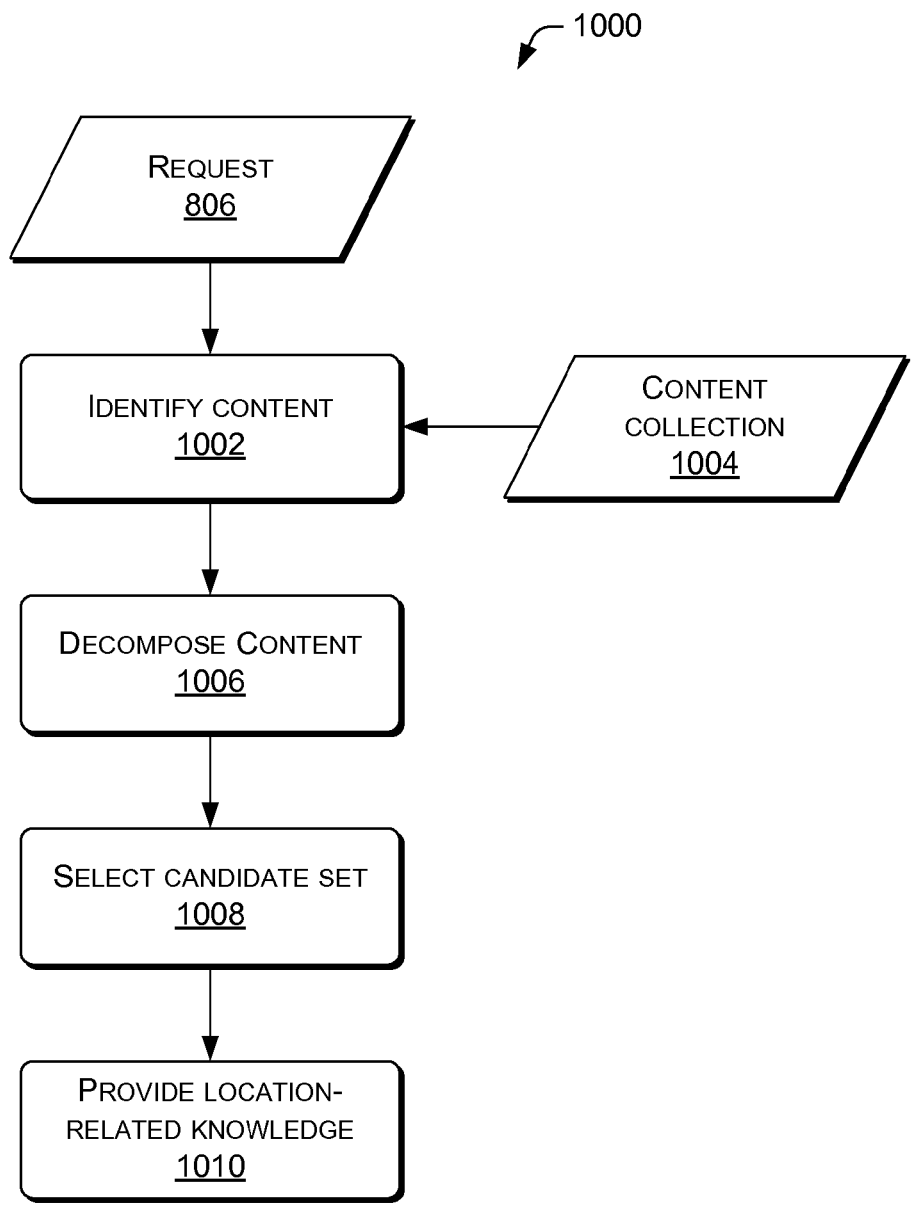
FIG. 10 is a flow diagram showing an illustrative process of mining topic-related aspects from user-generated content comprising travelogues.

FIG. 10 shows an illustrative process 1000 as performed by system 800 of FIG. 8 for automatically mining topic-related aspects from user generated content, e.g., mining location-related aspects from travelogues. This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the system 800 of FIG. 8, other architectures may implement this process in whole or in part.

At 1002, content is identified from a content collection 1004. For example, in response to request 806, one or more components of content service 802 accesses content such as general content 818 or travelogue collection 816. Similar to a travelogue collection 816, as mentioned above, content collection 1004 includes user generated content, although editorial content may also be included.

In various implementations, content service 802 may be configured to receive a request 806 at various levels of granularity. For example, content service 802 may be configured to receive a single word or image as a destination query as well as various location descriptors as a request 806.

At 1006, location learning logic 808 decomposes a travelogue from content collection 1004, for example as discussed above with regard to FIG. 2. Decomposition enables location learning logic 808 to learn locations and corresponding local topics as well as global topics from words in the travelogue by analyzing the content identified at 1002. As discussed above, global topics are also filtered. Generally, the decomposition is accomplished by implementing a probabilistic topic model such as the Location-Topic (LT) model 810, discussed above, to discover topics from the travelogue and virtually simultaneously represent locations with appropriate corresponding topics of interest to tourists planning travel.

At 1008, selection logic 812 selects a candidate set corresponding to the locations identified in 1006. For example, selection logic 812 extracts locations mentioned in the text of travelogues 104.

At 1010, selection logic 812 provides the location-related knowledge learned by the model, to support various application tasks.

Figure 11:
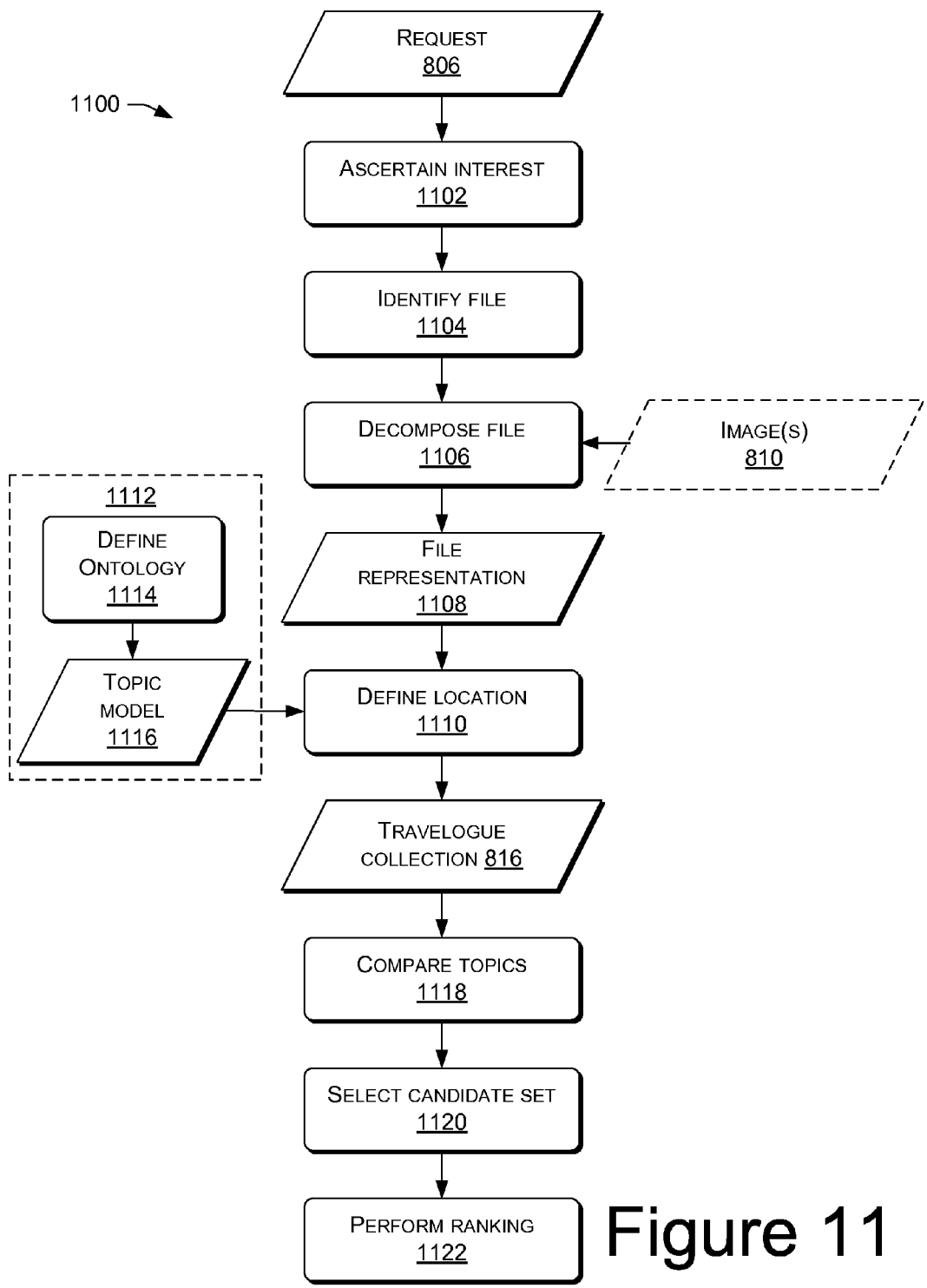
FIG. 11 is a flow diagram showing an illustrative process of mining topic-related aspects from user-generated content comprising travelogues.

FIG. 11 shows another example process 1100 for automatically mining location-related aspects from travelogues.

Blocks 1102 through 1110 and 1118 through 1122, shown in the vertical center of FIG. 11, are typically performed in response to a request 806 received at content service 802. In response to the request 806, travelogue results are selected and provided, for example through viewer 804.

At 1102 a location or location related topic of interest is ascertained from request 806, for example via location learning logic 808.

At 1104 a travelogue is identified for mining, for example by selection logic 812.

At 1106 the selected travelogue is decomposed, for example with Location-Topic (LT) model 810. In various embodiments, this corresponds with decomposition 200 and/or 1006 discussed with regard to FIGS. 2 and 10, above. In at least one implementation, a decomposition model (DM), e.g. document decomposition model (DDM), image decomposition model (IDM), etc. decomposes the travelogue. The decomposition model described herein uses a flexible and widely applicable approach. The base function is to partition a file into local topics including locations and location characteristics, and global topics. In various implementations the global topics are abandoned, and the locations and location characteristics facilitate compact representation and efficient indexing. However, global topics need not be abandoned, and may be mined in some implementations, for example to obtain traveler commentary on particular hotels, airlines or rental car companies serving a location.

In some situations, images in, or associated with, travelogues or travel locations are represented by a "bag of visual terms" (BOV), which allows text indexing techniques to be applied in large-scale image retrieval systems. However, an image query using BOV may approximate a long-query due to the large number of terms, e.g. 100, 1000, 1500 visual terms. Thus techniques for typical text queries (e.g. 2-10 terms) are inapplicable and using some text indexing techniques, e.g. inverted list, returns results that are misleading because the most distinguishing terms may be disregarded.

In some instances, a document-like representation of an image may serve as a file for decomposition by the decomposition model. Because the processing to obtain the BOV representation is optional, image(s) 820 is illustrated with a dashed line in FIG. 11. As mentioned above, decomposition of the travelogue at 1106 includes identifying local topics and global topics that include background words. In several embodiments, while the local-topic-related words are projected onto a feature vector, the global-topic words, or a predetermined number of the global-topic words, are retained, and any remaining or background words are discarded. In at least one embodiment, the local-topic-related words are projected onto a feature vector and each of the global-topic words is discarded.

The processing represented by block 1106 may be performed, for example, by location learning logic 808. As described above with reference to FIG. 8, location learning logic 808 decomposes a travelogue (d) according to LT model 810 to discover topics from travelogues and represent locations with the learned topics. A travelogue document is treated as a mixture of topics, where each topic is a multinomial distribution over terms in the vocabulary and corresponds to some specific semantics. According to the described LT model 810, travelogues are composed of local and global topics, and each location is represented by a mixture of (more specifically, a multinomial distribution over) local topics. Thus, the LT model 810 automatically discovers local and global topics, as well as each location's distribution over local topics, from travelogue collection 816.

Decomposition of a travel-related file at 1106 results in a representation of the file, shown as file representation 1108. File representation 1108 provides an effective approximation of a travelogue from travelogue collection 816, except that file representation 1108 requires much less storage space than the raw file. Further, file representation 1108 provides for an efficient indexing solution.

At 1110, the representation 1108 is used as the basis of a textual search against topic model 1116 to define a location.

In some instances the process shown in dashed block 1112 is an offline process, performed prior to, or simultaneously with, the other actions shown in FIG. 11, to prepare reference data, which will be used by the run-time process of dynamically selecting results shown on the portion of FIG. 11 that is outside of block 1112. In other instances, the process shown in dashed block 1112 is performed during the run-time process of dynamically selecting results shown in FIG. 11.

At 1114, an ontology of local topics is defined in a vertical domain of certain types of documents, e.g., travelogues, for use by topic model 1116. The vertical domain is defined with a hierarchical tree structure. A topic model 1116 such as the LT model described herein comprises a hierarchical category tree, which is based on an open directory project (ODP) or concept hierarchy engine (CHE), or other available taxonomies. The hierarchical category tree is made up of category nodes. In the hierarchical structure, category nodes represent groupings of similar topics, which in turn can have corresponding sub-nodes or smaller groups of topics.

Topic model 1116 is compiled offline, and used as a resource, for example by block 1110. In other embodiments, the topic model 1116 is determined dynamically, in conjunction with other processing shown in FIG. 11.

At 1118, the defined location is compared or mapped to the collection of travelogue content 816. In several embodiments the collection of travelogue content 816 comprises representations of individual records of the collection of travelogue content 816, and at 1118, location learning logic 808 compares one or more of the location and/or the local topics of the representations of the records of the collection of travelogue content 816 and request 806.

At 1120, selection logic 812 selects a candidate set of results based on the comparison performed at 1118.

At 1122, selection logic 812 ranks the candidate set of search results selected at 1120 based on the location and/or the associated local topics.

Figure 12:
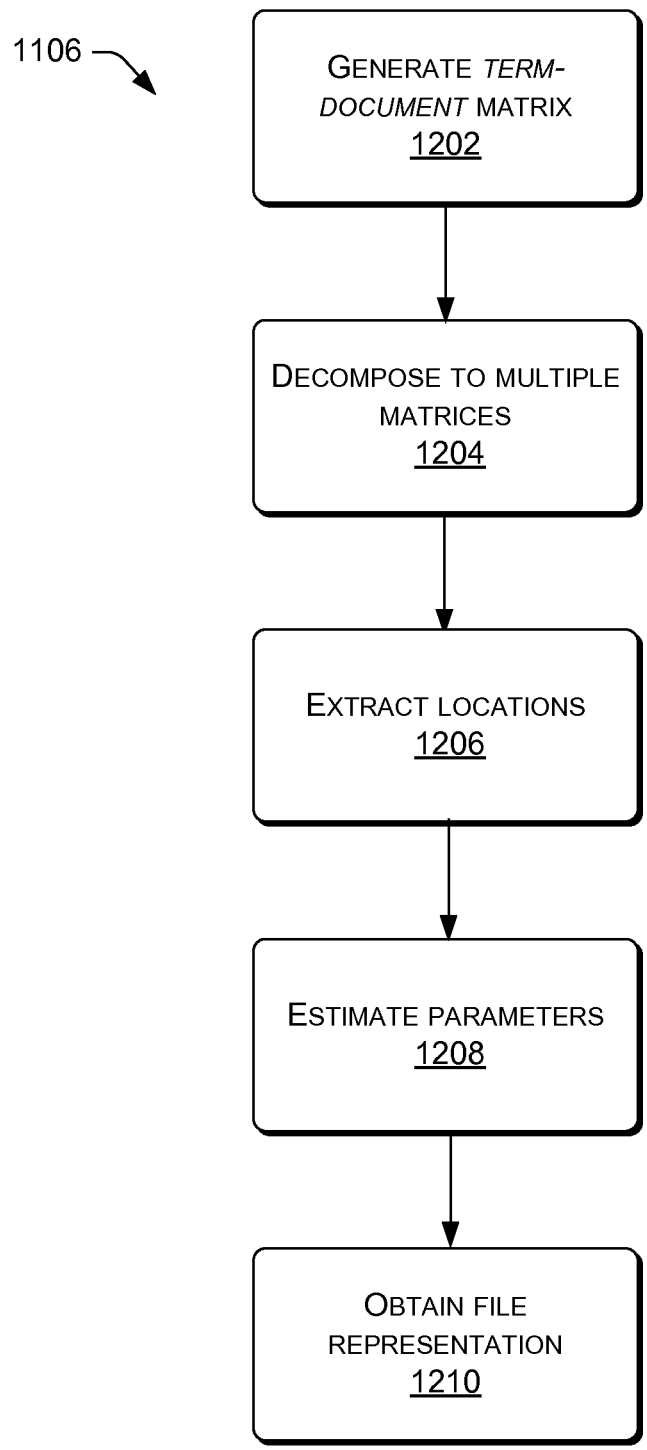
FIG. 12 is a flow diagram showing additional aspects of an illustrative process of mining topic-related aspects from user-generated content comprising travelogues.

FIG. 12 shows an example process 1106 to decompose a travelogue. Process 1106 involves decomposing a file, e.g. a travelogue or a blog into local topics and global topics, which transforms the file to file representation 1108 shown in FIG. 11.

At 1202 a term-document matrix is generated to represent a collection of travelogues 104, where the $j^{th}$ column encodes the $j^{th}$ document's distribution over terms, as illustrated at 702 of FIG. 7.

At 1204, based on this representation, the location learning logic 808 decomposes a given term-document matrix 702 into multiple matrices, including, for example, Term-LocalTopic matrix 708, Term-GlobalTopic matrix 714, LocalTopic-Location matrix 710, GlobalTopic-Document matrix 716 and Location-Document matrix 712 as discussed above.

At 1206 locations are extracted. In some instances observed information, such as existing location labels, (e.g., user-submitted tags, automatically generated tags, etc.), associated with a travelogue may be employed to build the Location-Document matrix 712. However, due to such document-level labels typically being too coarse to cover all the described locations in travelogues, or even incorrectly marked, extracting locations from travelogue text may be advantageous. As described above, there are several methods for location extraction, e.g., looking up a gazetteer, or applying a Web service like Yahoo Placemaker™. In several implementations, location learning logic 808 employs an extractor based on a gazetteer and location disambiguation algorithms considering geographic hierarchy and textual context of locations.

The extracted locations can provide an indication of locations described in a travelogue. However, such extracted locations are frequently not sufficient to complete the Location-Document matrix 712 due to an observed possible gap between the extracted locations and the locations actually described in the travelogue. For instance, a series of locations may be mentioned in a trip summary, without any description or with minimal description in the text of the travelogue. The tools and techniques for mining location-related aspects from travelogues leverages how travelogue authors typically concentrate descriptions of some locations in consecutive sentences. Thus, consecutive words tend to correspond to the same locations. Considering these observations, location learning logic 708 treats all of the words in a segment (e.g., a document, paragraph, sentence, or sliding window) as sharing a multinomial distribution over locations, which is affected by a Dirichlet prior derived from the extracted locations in the segment. In this way, the Location-Document matrix 712 is kept variable to better model the data, while also benefiting from the extracted locations as priors.

At 1208, parameters, including latent variables, are estimated. The estimation is conditioned on observed variables: $p(x, l, z|w, \delta, \alpha, \beta, \gamma, \eta)$, where x, l, and z are vectors of assignments of global/local binary switches, locations, and topic terms in the travelogue collection 816.

In several implementations collapsed Gibbs sampling is employed to update global topics and local topics during parameter estimation 1208. For example, location learning logic 808 employs collapsed Gibbs sampling with the following updating formulas.

For global topic $z \in \{1, \ldots, T^{gl}\}$, $$p(x_i = gl, z_i = z | w_i = w, x_{\backslash i}, z_{\backslash i}, w_{\backslash i}, \alpha, \gamma, \eta^{gl}) \propto \cdot$$

$$\frac{n_{w,\backslash i}^{gl,z} + \eta^{gl}}{\sum_{w'} n_{d,\backslash i}^{gl} + W\eta^{gl}} \cdot \frac{n_{d,\backslash i}^{gl} + \alpha}{n_{d,\backslash i}^{gl} + T^{gl}\alpha} \cdot (n_{d,s,\backslash i}^{gl} + \gamma^{gl}),$$

and for local topic $z \in \{1, \ldots, T^{loc}\}$, $l \in \mathcal{L}_{d,s}$ $$p(x_i = loc, l_i = l, z_i = z | w_i = w, x_{\backslash i}, l_{\backslash i} z_{\backslash i}, w_{\backslash i}, \beta, \gamma, \eta^{loc}) \propto \cdot$$

$$\frac{n_{w,\backslash i}^{loc,z} + \eta^{loc}}{\sum_{w'} n_{w',\backslash i}^{loc,z} + W\eta^{loc}} \cdot \frac{n_{l,\backslash i}^{loc,z} + \beta}{n_{l,\backslash i} + T^{loc}\beta} \cdot \frac{n_{d,s,\backslash i}^{l} + \chi_{d,s,l}}{n_{d,s,l}^{loc} + \chi_{d,s}} \cdot (n_{d,s,\backslash i}^{loc} + \gamma^{loc}),$$

where $n_{w,\backslash i}^{gl,z}$ denotes the number of times term w is assigned to global topic z, and similarly $n_{w,\backslash i}^{loc,z}$ denotes the number of times term w is assigned to local topic z.

Regarding document d, $n_{d,\backslash i}^{gl,z}$ denotes the number of times a word in document d is assigned to global topic z, while $n_{d,\backslash i}^{gl}$ denotes the number of times a word in document d is assigned to a global topic. Regarding location l, $n_{l,\backslash i}^{loc,z}$ denotes the number of times a word assigned to location l is assigned to local topic z, out of $n_{l,\backslash i}$ words assigned to location l in total. Regarding segment s, $n_{d,s,\backslash i}^{l}$ denotes the number of times a word in segment s of document d is assigned to location l, and consequently a local topic, while $n_{d,s,\backslash i}^{gl}$ denotes the number of times a word in segment s of document d is assigned to a global topic and $n_{d,s,\backslash i}^{loc}$ denotes the number of times a word in segment s of document d is assigned to a local topic. The subscript \i indicates that the $i^{th}$ word is excluded from computation.

After such a Gibbs sampler reaches burn-in, location learning logic 808 harvests several samples and counts the assignments to estimate the parameters:

$$\phi_{z,w}^{x} \propto n_w^{x,z} + \eta^x, x \in \{gl, loc\}, z=1, \ldots, T^x, \psi_{l,z} \propto n_l^{loc,z} + \beta,$$
$$z=1, \ldots, T^{loc}.$$

At 1210, location learning logic 808 obtains a file representation 1108 of user-generated content, (e.g., travelogue, blog, etc.) The file is represented by local topics illustrated in the (I) box 704 of FIG. 7, and global topics illustrated in the (II) box 706 of FIG. 7.

Figure 13:
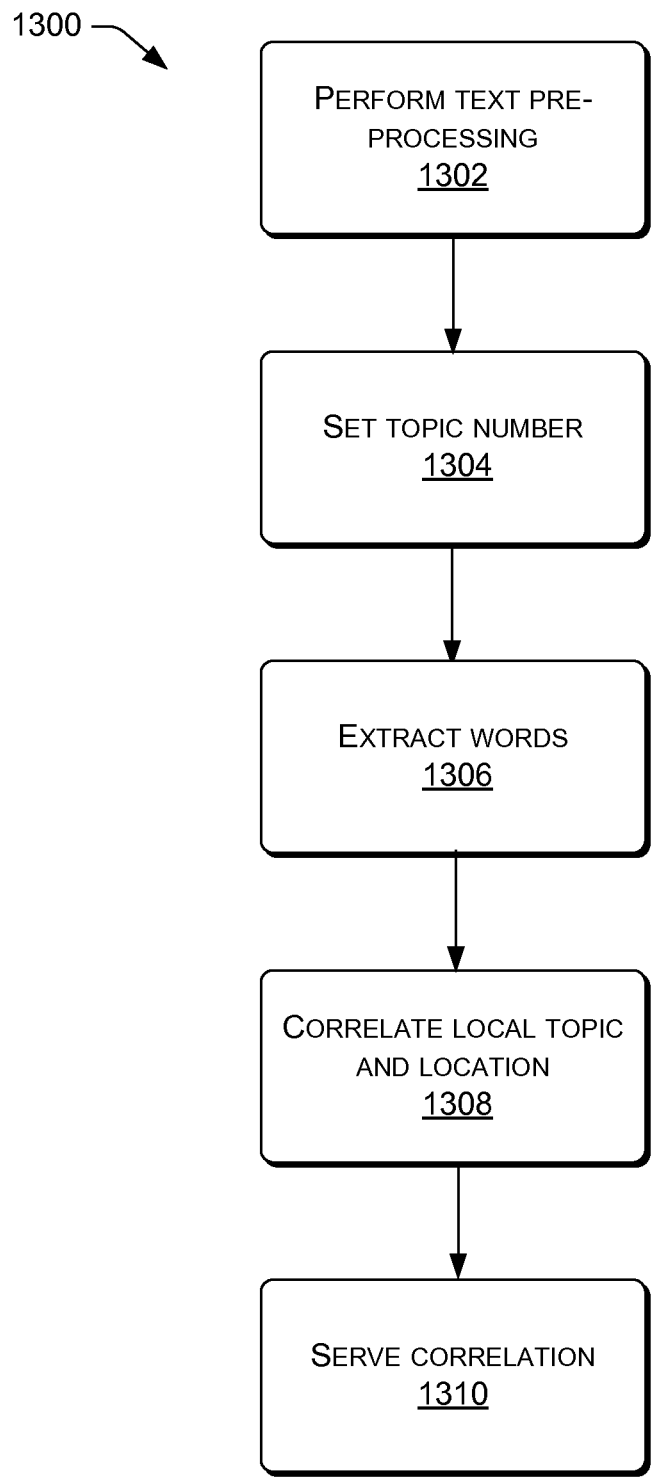
FIG. 13 is a flow diagram showing additional aspects of an illustrative process of mining topic-related aspects from user-generated content comprising travelogues.

FIG. 13 illustrates an example process 1300 of travelogue modeling to obtain topics and locations for comparison at 1118. Process 1300 involves location learning logic 808 processing a file, e.g. a travelogue or a blog, to train LT model 810 to learn local topics and global topics.

At 1302, location learning logic 808 performs text pre-processing including, for example, stemming and stop-word removal.

At 1304, a number of local and global topics are set. In several implementations, LT model 810 is trained on a variety of data sets to learn a configurable number of local topics and global topics. For example, the numbers of local and global topics may be set to a range corresponding to the size of the data set, e.g., about 0.10, 0.15, 0.20, etc, or empirically, e.g., 300, 200, 100, 50, etc.

At 1306, words within a threshold probability in a topic are extracted. In various implementations the threshold is configurable, for example, based on the total number of words in a travelogue, a travelogue collection, or empirically, e.g., 5, 10, 20, etc.

At 1308, a correlation between a local topic z and a location l is measured by the conditional probability (z|l), which is equal to $\psi_l$, as discussed above.

At 1310, learned correlations are served for use in a variety of travel planning applications. In several implementations the correlations are stored for future use as part of travelogue collection 816 and maintained for use by a service such as content service 802.

As noted above, the order in which the processes have been described is not intended to be construed as a limitation, and any number of the described process blocks can be combined in any order to implement the processes, or alternate processes. Additionally, individual blocks or processes may be deleted without departing from the spirit and scope of the subject matter described herein. For example, in at least one embodiment, process 1000 as discussed regarding FIG. 10, is performed independently of processes 1100, 1106, and 1300, as discussed regarding FIGS. 11, 12, and 13. However, in other embodiments, performance of one or more of the processes 1000, 1100, 1106, and 1300 may be incorporated in, or performed in conjunction with each other. For example, process 1106 may be performed in lieu of block 1006 of FIG. 10.

Example Operating Environment

Figure 14:
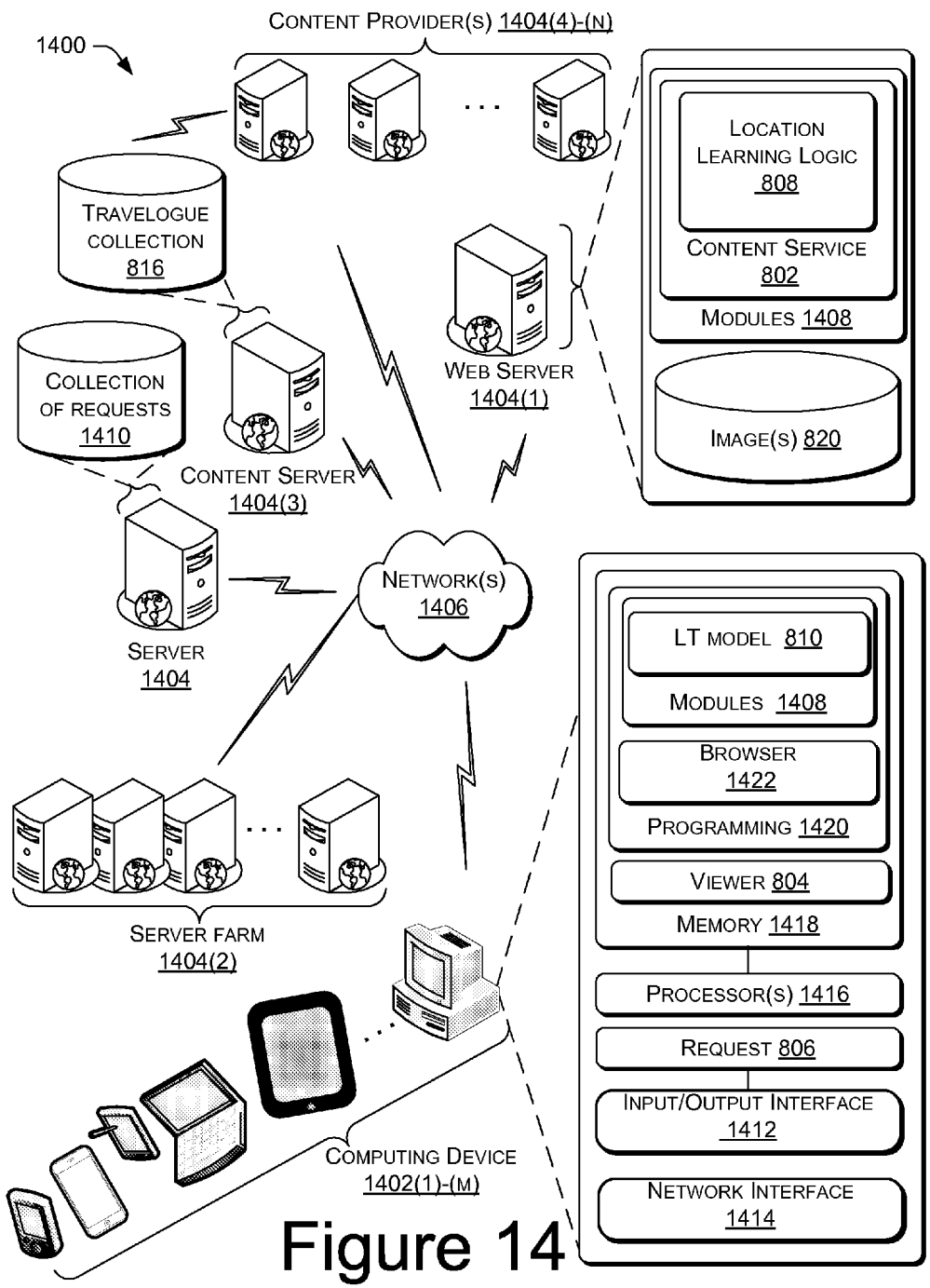
FIG. 14 is a pictorial representation of an illustrative operating environment.

The environment described below constitutes but one example and is not intended to limit application of the system described above to any one particular operating environment. Other environments may be used without departing from the spirit and scope of the claimed subject matter. The various types of processing described herein may be implemented in any number of environments including, but not limited to, stand along computing systems, network environments (e.g., local area networks or wide area networks), peer-to-peer network environments, etc. FIG. 14 illustrates a variety of devices and components that may be implemented in a variety of environments in which mining location-related aspects from user-generated content may be implemented.

FIG. 14 illustrates an example operating environment 1400 including one or more computing devices 1402 and one or more servers 1404 connected through one or more networks 1406. Computing devices 1402 may include, for example, computing devices 1402(1)-(M). Computing device 1402 may be one of a variety of computing devices, such as a desktop computer, a laptop computer, a smart phone, a multifunction mobile device, a personal digital assistant, a netbook computer, a tablet computer, or a server. Other examples of computing devices 1402 not shown in FIG. 14 may include, for example, a set-top box, a cellular telephone, and a laptop computer.

Servers 1404 include, for example, web server 1404(1), a server farm 1404(2), a content server 1404(3), and content provider(s) 1404(4)-(N). In various implementations, processing and modules discussed above with reference to FIGS. 7-13 may be implemented in any number of combinations across any number of the servers 1404 and computing devices 1402 shown in FIG. 14. For example, in various embodiments, results may be served by, or requested from, travelogue collection 816 housed on a content server 1404(3) or directly from content provider(s) 1404(4)-(N).

In the illustrated embodiment a web server 1404(1) also hosts images and/or document-like representations of images 820, alternately called an image corpus, which content service 802 searches for graphically similar images. As illustrated, modules 1408 may be located at a server, such as web server 1404 and/or may be included in modules 1408 on any other computing device 1402. Similarly, a request 806 may be located at computing device 1402, sent over a network such as network(s) 1406 via streaming media, stored at a server 1404, or as part of a webpage such as at web server 1404(1) or server farm 1404(2).

In the example illustrated, content providers 1404(4)-(N) provide content that forms travelogue collection 816, which may then be accessed via networks 1406 through content server 1404(3) while another server 1404 maintains a collection of requests 1410.

Network 1406 may enable communication between a plurality of device(s) 1402 and/or server(s) 1404. Network 1406 can comprise a global or local wired or wireless network, such as the Internet, a local area network (LAN), or an intranet.

As illustrated, example computing device 1402 further includes at least one input/output interface 1412 and network interface 1414. Input/output interface 1412 enables computing device 1402 to receive input (e.g., request 806) and output results (e.g., through viewer 804). Network interface 1414 enables communication between computing device 1402 and servers 1404 over network(s) 1406. For example, request 806 may be communicated from computing device 1402, over network 1406, to web server 1404(1).

Example computing device 1402 includes one or more processor(s) 1416 and computer-readable storage media such as memory 1418. Depending on the configuration and type of computing device 1402, the memory 1418 can be implemented as, or may include, volatile memory (such as RAM), nonvolatile memory, removable memory, and/or non-removable memory, any may be implemented in any method or technology for storage of information, such as computer-readable instructions, data structures, program modules, or other data shown generally at 1408. Also, the processor(s) 1416 may include onboard memory in addition to or instead of the memory 1418. Some examples of storage media that may be included in memory 1418 and/or processor(s) 1416 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 1416. The computing device 1402 may also include input/output devices including a keyboard, mouse, microphone, printer, monitor, and speakers (not shown).

Various types of programming 1420 is embodied on the computer-readable storage media and/or memory 1418 and is accessed and/or executed by processor(s) 1416. In at least one embodiment, the computer-readable storage media comprises, or has access to, a browser 1422, which is a module, program, or other entity capable of interacting with a network-enabled entity. Request 806 may be submitted to content service 802 via browser 1422 in at least one instance.

In various implementations, modules 1408 contain computer-readable instructions for building an LT model 810 and for implementing content service 802 including location learning logic 808. Device 1402 represents computing hardware that can be used to implement functional aspects of the system shown in FIG. 8 at a single location or distributed over multiple locations. Network interface 1414 can connect device 1402 to a network 1406.

Device 1402 may serve in some instances as server 1404. In instances where device 1402 operates as a server, components of device 1402 may be implemented in whole or in part as a web server 1404(1), in a server farm 1404(2), as a content server 1404(3), and as one or more provider(s) of content 1404(4)-(N). Although discussed separately below, it is to be understood that device 1402 may represent such servers and providers of content.

Device 1402 also stores or has access to request 806. As discussed above, request 806 includes documents, images collected by a user of device 1402, including photographs taken by consumers using digital cameras and/or video cameras and/or camera enabled cellular telephones, or images obtained from other media. Although shown located at server 1404 in FIG. 14, such content may alternatively (or additionally) be located at device 1402, sent over a network via streaming media or as part of a service such as content service 802, or stored as part of a webpage, such as by a web server. Furthermore, in various embodiments request 806 may be located at least in part on external storage devices such as local network devices, thumb-drives, flash-drives, CDs, DVRs, external hard drives, etc. as well as network accessible locations.

In the context of the present subject matter, programming 1420 includes modules 1408, supplying the functionality for implementing tools and techniques for mining location-related aspects from travelogues and other aspects of FIG. 1 and FIG. 8. The modules 1408 can be implemented as computer-readable instructions, various data structures, and so forth via at least one processor 1416 to configure a device 1402 to execute instructions to implement content service 802 including location learning logic 808, LT model 810 and/or selection logic 812 based on request 806. The computer-readable instructions may also configure device 1402 to perform operations implementing location learning logic 808 comparing request 806 with topics of travelogue collection 816 to return results based on request 806. Functionality to perform these operations may be included in multiple devices or a single device as represented by device 1402.

Various logical components that enable mining location-related aspects from travelogues and travelogue collections 816 may also connect to network 1406. Furthermore, request 806 may be sent locally from a computing device such as 1402 or from one or more network accessible locations, streamed, or served from a server 1404. Aspects of computing devices, such as computing devices 1402 and servers 1404, in at least one embodiment include functionality for mining location-related aspects of travelogues using location learning logic 808 based on a collection or requests 1410 containing request 806.

CONCLUSION

Although mining topic-related aspects from user-generated content has been described in language specific to structural features and/or methodological acts, it is to be understood that the techniques defined in the appended claims are not necessarily limited to the specific features or acts described. Rather, the specific features and acts are disclosed as illustrative forms of implementing the claims.

We claim:

1. A memory having computer executable instructions encoded thereon, the computer executable instructions executed by a processor to perform location-related mining operations, the operations comprising:
   identifying a particular travelogue;
   decomposing the particular travelogue by identifying at least two non-overlapping segments of the particular travelogue, each segment including a representation of at least one location;
   representing a collection of travelogues with a term-document matrix, the collection of travelogues comprising the particular travelogue, and each word of the particular travelogue representing:
      a location, a local topic, and a term in a sequence; or
      a global topic and a term in a sequence;
   using a probabilistic topic model, decomposing the term-document matrix into one or more matrices comprising:
      a term-local topic matrix;
      a local topic-location matrix; or
      a location-document matrix; and
   representing a particular location by a multinomial distribution over local topics while associating a document with a multinomial distribution over global topics.

2. A memory as recited in claim 1, wherein the one or more matrices further comprise at least one of a term-global topic matrix or a global topic-document matrix.

3. A memory as recited in claim 1, wherein words in a segment share a multinomial distribution over locations, the multinomial distribution being affected by a Dirichlet prior derived from locations extracted from the segment.

4. A memory as recited in claim 1, wherein the decomposing the term-document matrix further comprises estimating parameters for the probabilistic topic model.

5. A memory as recited in claim 1, further comprising based at least on the multinomial distribution of the particular location, enriching a travelogue browsing experience by associating one or more images with the particular location.

6. A method comprising:
   identifying a travelogue for location-related mining;
   decomposing the travelogue;
   representing a decomposed travelogue with a term-document matrix, wherein each word from the travelogue represents one of:
      a local topic; or
      a global topic;
   selecting a candidate set of travelogues based at least on the local topic;
   ranking the travelogues in the candidate set of travelogues based at least on the local topic; and
   returning travelogues in the candidate set of travelogues based at least on the ranking.

7. A method as recited in claim 6, wherein a file for the location-related mining comprises local topic words and global topic words.

8. A method as recited in claim 6, wherein a location is identified based at least on a part of an index of a configurable number of local topic words.

9. A method as recited in claim 6, wherein the candidate set of travelogues comprises a compound representation of travelogues having undergone dimension reduction.

10. A method as recited in claim 6, further comprising determining a location associated with the local topic.

11. A method as recited in claim 6, further comprising determining a travelogue topic corresponding to each travelogue of the candidate set of travelogues.

12. A method as recited in claim 6, further comprising:
    determining a location-related topic corresponding to at least one of the local topic;
    determining a travelogue topic corresponding to each travelogue of the candidate set of travelogues; and
    searching among the travelogues topics corresponding to each of the candidate set of travelogues to find one or more travelogue topics similar to the location-related topic; and
    selecting those travelogues from the candidate set of travelogues having travelogue topics corresponding to the location-related topic.

13. A method as recited in claim 6, further comprising providing recommendations based at least on the ranking.

14. A memory having computer-executable instructions encoded thereon to program a computer to perform the method of claim 6 upon execution.

15. A computer-implemented method comprising:
    in response to Internet browsing activities, identifying a collection of user generated content;
    searching an image library for images having associated descriptive data that is similar to text in the collection of user generated content;
    processing the descriptive data of the images to derive a topic for the collection of user generated content;
    selecting a recommendation based at least in part on the topic derived; and
    in further response to the Internet browsing activities, presenting the recommendation.

16. A method as recited in claim 15, wherein the Internet browsing activities comprise blogging.

17. A method as recited in claim 15, wherein user generated content comprises one or more travelogues.

18. A method as recited in claim 15, wherein processing the descriptive data comprises searching a vertical topic space based on the descriptive data.

19. A method as recited in claim 15, wherein searching the image library comprises:
   deriving image content information from a plurality of entries of user generated content that have associated images in the collection of user generated content; and
   comparing the image content information derived to image content information of images in the image library.

20. A method as recited in claim 15, wherein processing the descriptive data of the images comprises:
   mining the descriptive data of the images for one or more local topics; and
   applying the one or more local topics to derive at least one location for the collection of user generated content.

* * * * *